US010445876B2

(12) United States Patent
Nieves Alicea et al.

(10) Patent No.: US 10,445,876 B2
(45) Date of Patent: Oct. 15, 2019

(54) METHODS AND SYSTEMS FOR ASSESSING CELL MORPHOLOGY

(71) Applicant: Abbott Laboratories, Abbott Park, IL (US)

(72) Inventors: Rene Nieves Alicea, San Francisco, CA (US); Wenjing Li, Sunnyvale, CA (US)

(73) Assignee: Abbott Laboratories, Abbott Park, IL (US)

(*) Notice: Subject to any disclaimer, the term of this patent is extended or adjusted under 35 U.S.C. 154(b) by 5 days.

(21) Appl. No.: 15/379,250

(22) Filed: Dec. 14, 2016

(65) Prior Publication Data

US 2017/0178321 A1     Jun. 22, 2017

Related U.S. Application Data

(60) Provisional application No. 62/269,205, filed on Dec. 18, 2015.

(51) Int. Cl.
*G06T 7/00* (2017.01)
*G06K 9/00* (2006.01)
(Continued)

(52) U.S. Cl.
CPC .......... *G06T 7/0012* (2013.01); *G06K 9/0014* (2013.01); *G06K 9/00127* (2013.01); *G06K 9/00147* (2013.01); *G06K 9/4604* (2013.01); *G06K 9/4652* (2013.01); *G06K 9/4661* (2013.01); *G06K 9/525* (2013.01); *G06K 9/6267* (2013.01); *G06K 2009/4666* (2013.01);
(Continued)

(58) Field of Classification Search
CPC ................................................. G06K 9/00127
See application file for complete search history.

(56) References Cited

U.S. PATENT DOCUMENTS 4,812,412 A * 3/1989 Turner ..................... G01N 1/30
436/15
5,787,189 A    7/1998 Lee et al.
(Continued)

OTHER PUBLICATIONS

He et al., "Histology image analysis for carcinoma detection and grading", Comput Methods Programs Biomed. Sep. 2012; 107(3), pp. 538-556 (Year: 2012).*
(Continued)

*Primary Examiner* — Ping Y Hsieh
*Assistant Examiner* — Jose Torres
(74) *Attorney, Agent, or Firm* — Edwards J. Baba; Payal B. Sud; Bozicevic, Field & Francis LLP

(57) ABSTRACT

The instant disclosure provides methods of extracting stain-independent features from digital images of histologically stained cells. Stain-independent features provide consistent assessment of cell morphology in the presence of staining variation and across different stains or stain formulations. Improved consistency in cell morphology assessments finds use in automated cell classification and other image processing applications. Also included are systems for practicing the described methods. The instant disclosure also provides computer readable media storing instructions that, when executed by a computing device, cause the computing device and/or components of a described system to perform steps of a method involving of extraction of stain-independent features from digital images.

32 Claims, 4 Drawing Sheets

(51) Int. Cl.
    *G06K 9/46*     (2006.01)
    *G06K 9/52*     (2006.01)
    *G06K 9/62*     (2006.01)

(52) U.S. Cl.
    CPC .................. *G06K 2209/05* (2013.01); *G06T 2207/10056* (2013.01); *G06T 2207/30024* (2013.01)

(56) References Cited

U.S. PATENT DOCUMENTS

| | | | |
|---|---|---|---|
| 9,011,773 B2 | 4/2015 | Shoffner et al. | |
| 9,028,778 B2 | 5/2015 | Mamaghani et al. | |
| 2008/0166035 A1 | 7/2008 | Qian et al. | |
| 2010/0254589 A1 | 10/2010 | Gallagher | |
| 2012/0263369 A1* | 10/2012 | Xie | G06T 7/0012 382/134 |
| 2013/0094750 A1* | 4/2013 | Tasdizen | G06K 9/0014 382/134 |
| 2014/0051114 A1* | 2/2014 | Ebi | G01N 15/1468 435/34 |
| 2015/0377866 A1* | 12/2015 | Motomura | G02B 21/06 435/288.7 |

OTHER PUBLICATIONS

Gurcan et al. (2009) "Histopathological Image Analysis: A Review" Reviews in Biomedical Engineering, 2: 147-171.
Horobin & Walter. (1987) "Understanding Romanowsky staining"Histochemistry, 86:331-336.
Hu (1962) "Visual pattern recognition by moment invariants" IRE Trans Inf Theory, 8:179-187.
Keyes & Winstanley. (2001) "Using moment invariants for classifying shapes on large-scale maps" Computers, Environment and Urban Systems, 25(1):119-130.
Marshall et al. (1975) "A standardized Romanowsky stain prepared from purified dyes" J Clin Pathol. 28(11):920-3.
Marshall et al. (1975) "An evaluation of some commerical Romanowsky stains" J Clin Pathol 28(8):680-5.
Marshall et al. (1978) "Staining properties and stability of a standardised Romanowsky stain" J Clin Pathol , 31(3):280-2.
Riordan et al. (2015) "Automated Analysis and Classification of Histological Tissue Features by Multi-Dimensional Microscopic Molecular Profiling" PloS One 10 : 1-18.

* cited by examiner

METHODS AND SYSTEMS FOR ASSESSING CELL MORPHOLOGY

CROSS-REFERENCE

This application claims the benefit of U.S. Provisional Patent Application No. 62/269,205 filed Dec. 18, 2015, which application is incorporated herein by reference in its entirety.

BACKGROUND

The morphological assessment of cells in histological specimens, including hematological specimens, is of utmost importance for monitoring health status and diagnosing diseases. To perform such assessment, on a hematological specimen (e.g., blood, body fluids, bone marrow aspirates, and other clinical specimens), for example, the specimen is smeared on glass slides, stained with Wright-Giemsa (WG), May-Grunwald (MG), or other hematological stains, and cells in these specimens are analyzed under the microscope. The accuracy of cell classification and counting is markedly dependent on the abilities and experience of the morphologist professional performing the analysis. In addition, the identification and differential count of blood cells is a time-consuming, repetitive task. Substituting automatic detection and morphology analysis of blood cells for the manual process is an important challenge in the domain of clinical diagnostic laboratories.

More recently in hematology, digital color images of cells are captured and automatic image processing algorithms are applied to segment, identify, classify and count these cells. Color information is fundamental for the automated analysis of cells and is used in combination with other texture and morphological features. However, many of these features are highly sensitive to variations in stain quality. Those variations are normally observed as the result of changes in stain reagents composition or stability, staining method, specimen variability, etc. Consequently, feature thresholds tuned for one stain may not work well for another stain, thus compromising the success of cell segmentation and classification.

SUMMARY

Aspects of the instant disclosure include a method of extracting stain-independent cellular features, the method comprising: generating a cellular mask of a digital image of a histologically stained specimen; extracting a first cellular feature of a cell, or portion thereof, defined by the cellular mask; extracting a second feature over a region of interest (ROI) of the histology specimen, wherein the first and second features are not affected by variation in the staining or are proportionally affected by variation in the staining; and determining a stain-independent feature of the cell by calculating the ratio of the first cellular feature to the second feature.

In other aspects, the method includes where the first cellular feature and the second feature are color features, lightness features, contour features, invariant moment features or image texture features.

In other aspects, the method includes where the cellular features are extracted over various ROIs, including where the first cellular feature is of a cell and the ROI is the cell, the first cellular feature is of the nucleus of a cell and the ROI is the nucleus of the cell or a portion thereof, the first cellular feature is of the cytoplasm of a cell and the ROI is the cytoplasm of the cell or a portion thereof, the first cellular feature is of a cell and the ROI is the nucleus of the cell or a portion thereof, the ROI is one or more nuclear lobes of the cell, the first cellular feature is of a cell and the ROI is the cytoplasm of the cell or a portion thereof, the first cellular feature is of a cell and the ROI is a non-cellular feature of the histology specimen (including e.g., where the non-cellular feature of the histology specimen is the background of the slide), the first cellular feature and the ROI are first and second ring portions of the cell concentric with the cell and/or the first cellular feature is of a cell and the ROI is a population of cells defined by the cellular mask.

In other aspects, the method includes classifying a cell based on a stain-independent feature, including e.g., where the classifying comprises identifying the cell type or identifying the cell as normal or abnormal.

In other aspects, the method includes where the stain-independent feature is extracted for a plurality of cells of the image.

In other aspects, the method includes color features derived from color channels of an image including e.g., the mean intensities in the red channel of the digital image, the mean intensities in the green channel of the digital image, the mean intensities in the blue channel of the digital image.

In other aspects, the method includes features derived from color-independent features including e.g., lightness features including color-independent mean intensities or color-independent median intensities. In some aspects, the color-independent mean intensities or color-independent median intensities include a plurality of concentric pallor rings.

In other aspects, the method includes features derived from color-independent features including e.g., contour features including e.g., perimeter, convex hull perimeter, maximal convexity depth, average convexity depth, area, convex hull area, circularity, convexity or combinations thereof.

In other aspects, the method includes where the histologically stained specimen from which the digital image is derived is a hematological stained specimen.

Aspects of the instant disclosure include a method of stain-independently assessing cell morphology in a histologically stained specimen, the method comprising: extracting one or more stain-independent cellular features as described herein; and comparing the one or more extracted stain-independent features to corresponding reference values for the one or more stain-independent features to assess the morphology of the cell.

In other aspects, the method includes assessments where the cell is a white blood cell, nucleated red blood cell or giant platelet and the stain independent cellular features include one or more features including a contour feature, an invariant moment feature, an image texture feature, a nuclear lobe feature, a ratio of two cellular color features, a ratio of a cellular color feature and a non-cellular color feature, or combinations thereof.

In other aspects, the method includes assessments where the cell is a red blood cell and the stain independent cellular features include one or more features including a contour feature, an invariant moment feature, an image texture feature, an optical density feature, a lightness feature, or combinations thereof.

Aspects of the instant disclosure include a method of extracting stain-independent cellular features, the method comprising: generating a cellular mask of a digital image of a histologically stained specimen; extracting a first cellular feature of a cell, or portion thereof, defined by the cellular mask; extracting a second feature of a cell, or portion thereof, of the histology specimen, wherein the first and second features are unaffected by variation in the staining or proportionally affected by variation in the staining; and determining a stain-independent feature of the cell by calculating the ratio of the first cellular feature to the second feature.

In other aspects, the method includes extracting features where the first cellular feature and the second feature are color features including e.g., where the first cellular feature is color feature of the cytoplasm of the cell and the second feature is a color feature of the nucleus of the cell.

In other aspects, the method includes extracting features where the first cellular feature and the second feature are contour features including e.g., where the first and second contour features include perimeter, convex hull perimeter, maximal convexity depth, average convexity depth, area, convex hull area, circularity, convexity or combinations thereof.

In other aspects, the method includes extracting features where the first cellular feature and the second feature are lightness features including, e.g., where the lightness features include color-independent mean intensities or color-independent median intensities. In some aspects, the lightness features include first and second pallor rings of the cell that are concentric with the cell and/or the lightness features include three or more pallor rings of the cell that are concentric with the cell. In some aspects, the pallor rings have relative diameters including e.g., where the relative diameter is 90% of the diameter of the cell, 80% of the diameter of the cell, 70% of the diameter of the cell, 60% of the diameter of the cell, 50% of the diameter of the cell, 40% of the diameter of the cell, 30% of the diameter of the cell, 20% of the diameter of the cell or 10% of the diameter of the cell. In some aspects, the lightness features include a central pallor of the cell.

In other aspects, the method includes extracting features where the first cellular feature and the second feature are invariant moment features.

In other aspects, the method includes extracting features where the first cellular feature and the second feature are image texture features.

In other aspects, the method includes classifying a cell based on a stain-independent feature including e.g., where the classifying comprises identifying the cell type and/or identifying the cell as normal or abnormal.

In other aspects, the method includes extracting a stain-independent feature as described herein for a plurality of cells of an image of a histologically stained specimen.

In other aspects, the method includes assessments where the histologically stained specimen is a hematological stained specimen.

Aspects of the instant disclosure include a method of stain-independently assessing cell morphology in a histologically stained specimen, the method comprising: extracting one or more stain-independent cellular features according to the methods described herein; and comparing the one or more extracted stain-independent feature to corresponding reference value for the stain-independent feature to assess the morphology of the cell.

Aspects of the instant disclosure include a method of extracting stain-independent cellular features, the method comprising: generating a cellular mask of a digital image of a histologically stained specimen; extracting a first cellular feature of a cell, or portion thereof, defined by the cellular mask; extracting a second feature of a population of cells defined by the cellular mask, wherein the first and second features are unaffected by variation in the staining or proportionally affected by variation in the staining; and determining a stain-independent feature of the cell by calculating the ratio of the first cellular feature to the second feature.

In other aspects, the method includes extracting a first cellular feature of a cell, or portion thereof, defined by the cellular mask and a second feature of a population of cells defined by the cellular mask where the second feature comprises a color feature of the population of cells defined by the cellular mask. In some aspects, the color feature is calculated in HSV color space, CIE color space, Lab color space, CIELUV color space, YCbCr color space or RGB color space. In some aspects, the color feature includes the mean intensities in one channel of the color space for the cells of the population including e.g., where the color feature includes the mean intensities in the red channel for the cells of the population, the mean intensities in the green channel for the cells of the population, the mean intensities in the blue channel for the cells of the population.

In other aspects, the method includes extracting a first cellular feature of a cell, or portion thereof, defined by the cellular mask and a second feature of a population of cells defined by the cellular mask from an image where the histologically stained specimen of the image is a hematological stained specimen, including e.g., where the cell of the first cellular feature is a red blood cell (RBC) and the population of cells of the second feature are RBCs.

Aspects of the instant disclosure include a method of stain-independently assessing cell morphology in a histologically stained specimen, the method comprising: extracting one or more stain-independent cellular features according to the methods as described herein; and comparing the one or more extracted stain-independent features to corresponding reference value for the stain-independent feature to assess the morphology of the cell.

Aspects of the instant disclosure include a system for classifying cells in a histologically stained specimen, the system comprising: a microscope; a digital camera attached to the microscope and configured to obtain a digital image of the specimen; image processing circuitry configured to: i) generate a cellular mask from the digital image; ii) extract a first cellular feature of a cell, or portion thereof, defined by the cellular mask; iii) extract a second feature over a region of interest (ROI) of the histology specimen, wherein the first and second features are unaffected by variation in the staining or proportionally affected by variation in the staining; iv) determine a stain-independent feature of the cell by calculating the ratio of the first cellular feature to the second feature; and v) compare the stain-independent feature to either a statistical value derived from a plurality of cells of the specimen or a reference value to classify the cell.

In other aspects, the system includes a memory and the memory includes reference values to which an extracted stain-independent feature is compared.

In other aspects, the system includes a signal system configured to report the classification of a cell classified according to the methods as described herein.

In other aspects, the system includes where the first extracted cellular feature, the second extracted feature or both comprise color features, lightness features, contour features, invariant moment features and/or image texture features.

In other aspects, the image processing circuitry of the system is further configured to delineate the first extracted cellular feature (including e.g., where the first cellular feature is the cell), delineate the ROI (including e.g., where the ROI is the nucleus of the cell), delineate the ROI (including e.g., where the ROI is the cytoplasm of the cell), delineate the first cellular feature (including e.g., where the first cellular feature is a ring portion of the cell concentric with the cell), delineate the ROI (including e.g., where the ROI is a ring portion of the cell concentric with the cell) and/or delineate the ROI (including e.g., where the ROI is a population of cells defined by the cellular mask).

In other aspects, the classification performed by the system includes identifying a cell type and/or identifying a cell as normal or abnormal.

In other aspects, the image processing circuitry of the system is configured to extract a stain-independent feature for a plurality of cells of the image and segment the image based on the stain-independent feature for the plurality of cells.

In other aspects, the image processing circuitry of the system is configured to calculate mean intensities for individual color channels of the digital image, calculate color-independent mean intensities or color-independent median intensities of the digital image and/or calculate contour features (including e.g., perimeter, convex hull perimeter, maximal convexity depth, average convexity depth, area, convex hull area, circularity, convexity or combinations thereof).

Aspects of the instant disclosure include a non-transitory computer readable medium storing instructions that, when executed by a computing device, cause the computing device to perform the steps of: generating a cellular mask from a digital image of a histologically stained specimen; extracting a first cellular feature of a cell, or portion thereof, defined by the cellular mask; and extracting a second feature over a region of interest (ROI) of the histology specimen, wherein the first and second features are unaffected by variation in the staining or proportionally affected by variation in the staining; and determining a stain-independent feature of the cell by calculating the ratio of the first cellular feature to the second feature.

In other aspects, the non-transitory computer readable medium includes instructions that, when executed by a computing device, cause the computing device to perform a step of comparing the stain-independent feature to either a plurality of cells of the specimen or a plurality of reference values to classify the cell.

In other aspects, the non-transitory computer readable medium includes the plurality of reference values used in a comparison to classify the cell.

DEFINITIONS

Figure 1A:
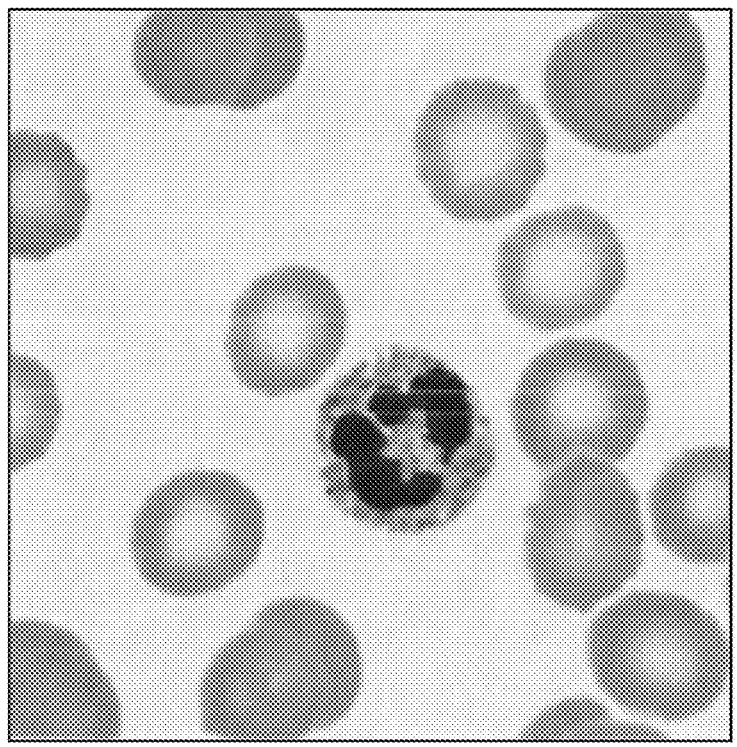
FIG. 1A-1B depicts a representative white blood cell image in red, green, blue (RGB) and corresponding nuclear and cytoplasm mask.

The term "assessing" includes any form of measurement, and includes determining if an element is present or not. The terms "determining", "measuring", "evaluating", "assessing" and "assaying" are used interchangeably and include quantitative and qualitative determinations. Assessing may be relative or absolute. "Assessing the identity of" includes determining the most likely identity of a particular compound or formulation or substance or cell type or cellular compartment or subcellular structure or cell morphology feature, and/or determining whether a predicted compound or formulation or substance or cell type or cellular compartment or subcellular structure or cell morphology feature is present or absent. "Assessing the quality of" includes making a qualitative, semi-quantitative or quantitative assessment of quality e.g., through the comparisons of a determined value to a reference or standard of known quality.

The term "histology" and "histological" as used herein generally refers to microscopic analysis of the cellular anatomy and/or morphology of cells obtained from a multicellular organism in This application claims the benefit of U.S. Provisional Patent Application No. 62/269,204 filed Dec. 18, 2015, which application is incorporated herein by reference in its entirety.

Including but not limited to plants and animals. As such, a "histological stain" refers to a stain used in the analysis of cellular anatomy and/or morphology and a "histology analyzer" refers to an instrument that analyzes the anatomy and/or morphology of cells obtained from a multicellular animal. As used herein a histology analyzer will generally refer to an instrument that uses one or more histological stains to make a histological assessment.

The term "cytology" and "cytological" as used herein generally refers to a subclass of histology that includes the microscopic analysis of individual cells, dissociated cells, loose cells, clusters of cells, etc. Cells of a cytological sample may be cells in or obtained from one or more bodily fluids. As such, a "cytological stain" refers to a stain used in the analysis of individual cells, dissociated cells, loose cells, clusters of cells, etc. and a "cytology analyzer" refers to an instrument that analyzes the anatomy and/or morphology of individual cells, dissociated cells, loose cells, clusters of cells, etc. As used herein a cytology analyzer will generally refer to an instrument that uses one or more cytological stains to make a cytological assessment.

The term "bodily fluid" as used herein generally refers to fluids derived from a "biological sample" which encompasses a variety of sample types obtained from an individual or a population of individuals and can be used in a diagnostic, monitoring or screening assay. The definition encompasses blood and other liquid samples of biological origin. The definition also includes samples that have been manipulated in any way after their procurement, such as by mixing or pooling of individual samples, treatment with reagents, solubilization, or enrichment for certain components, such as nucleated cells, non-nucleated cells, pathogens, etc.

The term "biological sample" encompasses a clinical sample, and also includes cells in culture, cell supernatants, cell lysates, serum, plasma, biological fluid, and tissue samples. The term "biological sample" includes urine, saliva, cerebrospinal fluid, interstitial fluid, ocular fluid, synovial fluid, blood fractions such as plasma and serum, and the like.

The terms "nuclear lobe" and "lobe", as used herein, generally refers to a single segment of a segmented nucleus of a cell. For example, the nuclei of certain white blood cell types may be segmented thus presenting with two or more nuclear lobes. In some instances, certain cells may have hypersegmented nuclei or hyposegmented nuclei, e.g., conjunction with a particular pathology. Nuclear lobe morphology The term "inputting", as used herein, is used to refer to any way of entering information into a computer, such as, e.g., through the use of a user interface. For example, in certain cases, inputting can involve selecting a reference spectrum or a spectral characteristic or library thereof that is already present on a computer system. In other cases, inputting can involve adding a spectrum or a spectral characteristic to a computer system, e.g., by measuring the spectrum of a sample on a device capable of interfacing with a computer. Inputting can also be done using a user interface.

As used herein, the term "executing" is used to refer to an action that a user takes to initiate a program.

As used herein, the term "software" generally includes but is not limited to, one or more computer instructions and/or processor instructions that can be read, interpreted, compiled, and/or executed by a computer and/or processor. Software causes a computer, processor, or other electronic device to perform functions, actions and/or behave in a desired manner. Software may be embodied in various forms including routines, algorithms, modules, methods, threads, and/or programs. In different examples software may be embodied in separate applications and/or code from dynamically linked libraries. In different examples, software may be implemented in executable and/or loadable forms including, but not limited to, a stand-alone program, an object, a function (local and/or remote), a servelet, an applet, instructions stored in a memory, part of an operating system, and so on. In different examples, computer-readable and/or executable instructions may be located in one logic and/or distributed between multiple communicating, cooperating, and/or parallel processing logics and thus may be loaded and/or executed in serial, parallel, massively parallel and other manners.

Suitable software for implementing various components of example systems and methods described herein may be developed using programming languages and tools (e.g., Java, C, C#, C++, C, SQL, APIs, SDKs, assembler). Software, whether an entire system or a component of a system, may be embodied as an article of manufacture and maintained or provided as part of a computer-readable medium. Software may include signals that transmit program code to a recipient over a network or other communication medium. Thus, in one example, a computer-readable medium may be signals that represent software/firmware as it is downloaded from a server (e.g., web server).

The term "signal", as used herein, includes but is not limited to, electrical signals, optical signals, analog signals, digital signals, data, computer instructions, processor instructions, messages, a bit, a bit stream, or other means that can be received, transmitted and/or detected.

A "connection" by which two components of a system, e.g., an electoral system, a data system, a computer system, circuitry system, etc., are connected will generally be an "operable connection", or a connection by which entities are "operably connected". The term "operable connection" and equivalents, is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, software). Logical and/or physical communication channels can be used to create an operable connection.

The term "communication"", as used herein in relationship to "computer communication" or "data transfer", refers to a communication between computing devices (e.g., computer, server, etc.) or component of a computer system (e.g., a memory store, a digital camera, etc.) and can be, for example, a network transfer, a file transfer, an applet transfer, an email, a hypertext transfer protocol (HTTP) transfer, and so on. A computer communication can occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, and so on.

The terms "computer" or "computer component" or "component of a computer system", as used herein, refers to a computer-related entity (e.g., hardware, firmware, software, and combinations thereof). Computer components may include, for example, a process running on a processor, a processor, an object, an executable, a thread of execution, a program, integrated circuitry, and a computer. A computer component(s) may reside within a process and/or thread. A computer component may be localized on one computer and/or may be distributed between multiple computers.

As used herein the terms "memory" and "data store" are used interchangeably and generally refer to a physical and/or logical entity that can store data. A data store may be, for example, a database, a table, a file, a list, a queue, a heap, a memory, a register, and so on. A data store may reside in one logical and/or physical entity and/or may be distributed between multiple logical and/or physical entities. A memory device may include a random-access memory (RAM), a read-only memory (ROM), an internal or external data storage medium (e.g., hard disk drive). Memory may be "permanent memory" (i.e. memory that is not erased by termination of the electrical supply to a computer or processor) or "non-permanent memory". Computer hard-drive, CD-ROM, floppy disk, portable flash drive and DVD are all examples of permanent memory. Random Access Memory (RAM) is an example of non-permanent memory. A file in permanent memory may be editable and re-writable.

The terms "bit depth" and "color depth" are used interchangeably and refer, as used herein, to the number of bits used to represent each pixel in an image. The terms are used to represent bits per pixel and, at other times including e.g., when an image has multiple color channels, the total number of bits used multiplied by the number of total channels of an image. For example, a typical color image using 8 bits per channel is often referred to as a 24-bit color image (8 bits×3 channels). Color scanners and color digital cameras may produce images at a variety of bit depths, including but not limited to e.g., 24-bit (8 bits×3 channels) images, 36-bit (12 bits×3 channels), 48-bit (16 bit×3 channels) images, etc. Grayscale image capture devices may also produce images at a variety of bit depths, though only in one channel, including but not limited to e.g., 1-bit (monochrome), 2-bit, 3-bit, 4-bit, 5-bit, 6-bit, 7-bit, 8-bit, 10-bit, 12-bit, 14-bit, 16-bit, etc. Individual grayscale images may be combined to generate a multichannel or color image where the resulting bit depth will depend on the bit depth of the individual grayscale images.

The term "image segmentation", as used herein, generally refers to the process of partitioning a digital image into multiple segments (sets of pixels, which in some instances may be referred to as superpixels). Image segmentation may be used to locate or otherwise isolated objects and/or boundaries (lines, curves, etc.) in an image. More precisely, image segmentation is the process of including, excluding or assigning a label to pixels in an image such that pixels included in the image (i.e., not excluded from the image) or with the same label share certain characteristics.

The terms "invariant moment", "Hu moment" and "Hu" as used herein refer to a moment, i.e., a specific quantitative measure of the shape of a set of points, evaluated from a two dimensional image according to the pixel intensities that is invariant under translation, changes in scale, and also rotation. Variant moments are efficient descriptors of the image's content, but are sensitive to several geometric (rotation, translation, scaling, etc.) and non-geometric (blur) transformations of the image. Invariant moments have the same properties as the corresponding variant moments but are robust to several image deformations. Hu Moments in particular can be used to describe, characterize, and quantify the shape of an object in an image and are often extracted from the silhouette or outline of an object in an image to extract a shape feature vector to represent the shape of the object. Invariant moments are described in e.g., Keyes & Winstanley. Using moment invariants for classifying shapes on large-scale maps.*Computers, Environment and Urban Systems* (2001) 25(1):119-130 and Hu Visual pattern recognition by moment invariants.*IRE Trans Inf Theory* (1962) 8:179-187; the disclosures of which are incorporated herein by reference in their entirety.

The term "pallor" as used herein, generally refers to a lightness or pale area of a cell and most often refers to a lightness feature of red blood cells (RBCs). A "central pallor", i.e., a pale or light area at or near the center of an RBC. Central pallor may vary in size, shape an positioning as within an RBC The terms "control", "control assay", "control sample" and the like, refer to a sample, test, or other portion of an experimental or diagnostic procedure or experimental design for which an expected result is known with high certainty, e.g., in order to indicate whether the results obtained from associated experimental samples are reliable, indicate to what degree of confidence associated experimental results indicate a true result, and/or to allow for the calibration of experimental results. For example, in some instances, a control may be a "negative control" assay such that an essential component of the assay is excluded such that an experimenter may have high certainty that the negative control assay will not produce a positive result. In some instances, a control may be "positive control" such that all components of a particular assay are characterized and known, when combined, to produce a particular result in the assay being performed such that an experimenter may have high certainty that the positive control assay will not produce a positive result. Controls may also include "blank" samples, "standard" samples (e.g., "gold standard" samples), validated samples, etc.

General definitions of digital imaging terms not specifically provided herein may be found in various print and online sources known in the art, including but not limited to the Glossary at the Federal Agencies Digitalization Guidelines Initiative (FADGI) available online at www(dot)digitizationguidelines(dot)gov/glossary/.

DETAILED DESCRIPTION

The instant disclosure provides methods of extracting stain-independent features from digital images of histologically stained cells. Stain-independent features provide consistent assessment of cell morphology in the presence of staining variation and across different stains or stain formulations. Improved consistency in cell morphology assessments finds use in automated cell classification and other image processing applications. Also included are systems for practicing the described methods. The instant disclosure also provides computer readable media storing instructions that, when executed by a computing device, cause the computing device and/or components of a described system to perform steps of a method involving of extraction of stain-independent features from digital images.

Before the present invention is described in greater detail, it is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

Certain ranges are presented herein with numerical values being preceded by the term "about." The term "about" is used herein to provide literal support for the exact number that it precedes, as well as a number that is near to or approximately the number that the term precedes. In determining whether a number is near to or approximately a specifically recited number, the near or approximating un-recited number may be a number which, in the context in which it is presented, provides the substantial equivalent of the specifically recited number.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, representative illustrative methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

Methods

The instant disclosure includes methods of extracting stain-independent cellular features from digital images of histologically stained cells. The disclosed methods generally include extracting stain-independent features for cell classification that allows an imaging system, including an automated imaging system, to analyze, classify and grade clinical specimens more accurately and reliably. The present disclosure also provides methods of extracting stain-independent features that allows for the automatic classification of cells with high accuracy, even when classification is performed on stained samples having variation in stain quality, staining quality, intensity of coloration, etc., that may be experienced with any particular stain or formulations thereof. Methods for extracting stain-independent features, which could be applied in any combination, will vary depending on various factors including e.g., the cells from which the stain-independent features are extracted. For example, in some instances, samples may include nucleated and/or enucleated cells including but not limited to e.g., nucleated white blood cells, nucleated red blood cells, enucleated red blood cells, and the like.

The present methods find use in various assessments that possess advantages over prior methods including but not limited to e.g., automated cell morphology assessments. For example, methods of the present disclosure may, alone or in combination, confer resistance to stain quality variations typically encountered in stained biological specimens, institute new approaches to analyze images of biological specimens, ensure a more accurate representation of a biological specimen's morphological features, ensure a more reliable specimen analysis and cell classification, and/or avoid re-development of assessment protocols that may be associated with changes in staining, including changes in stain properties (e.g., stain formulation, stain methodology, reagent stability, etc.).

Aspects of the methods may include obtaining a digital image of histologically stained cells from which stain-independent features are extracted.

Digital Images

Digital images of the subject methods may be newly acquired, e.g., including where the image is processed immediately following acquisition or may have been previously acquired and e.g., may be stored for some length of time on a suitable device or medium prior to processing. In some instances, previously acquired images may be stored in a database including e.g., a database of pre-collected images for computer training purposes, a database of pre-collected images of patient images, etc.

Acquired digital images may be captured using any suitable image capturing device. Suitable digital image capturing devices will be stand-alone image capture units or may be an integrated image capturing device that is part of a larger analysis system including e.g., a histology analyzer, an automated microscopy system, a hematology analyzer, a cytology analyzer, an imaging flow cytometer, an imaging microfluidics system, etc. Suitable digital image capturing devices will vary greatly depending on the particular imaging context, the purposes of image capture and the associated components of the device or system as a whole.

At a minimum a suitable image capturing device, for use in the described methods, will include a digital camera capable of capturing a digital image and a means of storing the digital image and/or transferring the image to attached image processing circuitry or to an attached storage device for later transfer to image processing circuitry. Suitable digital cameras will vary and will generally include any digital camera with sufficiently high resolution and sufficient color capture to capture an image that may be processed according to the methods described herein.

While certain aspects of the instant disclosure include processing the color information of a digital color image, in some instances, the values obtained may be color independent. As such, values may, in some instances, be obtained from grayscale images whether the grayscale image is captured using a non-color image capture device (e.g., a "black and white" or grayscale camera) or derived from a color image captured with a color image capture device. Which values of the instant disclosure may be obtained and/or processed color-independently (e.g., from a grayscale image) will be readily apparent to an ordinary skilled artisan and include but are not limited to, in some instances, values pertaining to e.g., a contour feature, an invariant moment feature, an image texture feature, an optical density feature, a lightness feature, etc., as described in greater detail herein.

In some instances, obtaining a digital image of histologically stained cells may include capturing a digital image of a histologically stained specimen from a subject where the specimen contains histologically stain cells or is prepared to include histologically stain cells.

In other instances, obtaining a digital image of histologically stained cells may include receiving a digital image including e.g., where the digital image is received from various sources including but not limited to an integrated imaging device, an external imaging device, a computer memory, a computer readable medium, a server, a remote server, etc. Digital images may be received by a data or computer connection or may be received on a computer readable medium.

A "digital image", as used herein, generally refers to a numeric representation (e.g., binary representation) of a two-dimensional image that may be of fixed or unfixed resolution. Fixed resolution images have a fixed number of rows and columns of pixels in an XY orientation. In some instances, digital images may be three-dimensional having fixed number of voxels in a XYZ orientation. Pixels and voxels are stored in computer memory as a raster image or raster map, a two-dimensional or three-dimensional array of small integers transmitted or stored in an uncompressed or compressed form. Suitable digital image file formats include but are not limited to e.g., BMP, BPG, CD5, DEEP, ECW, Exif, FITS, FLIF, GIF, HDR, HEIF, ILBM, ILBM, IMG, IMG, JPEG 2000, JPEG XR, JPEG/JFIF, Layered Image File Format, Nrrd, PAM, PBM, PCX, PGF, PGM, PLBM, PNG, PNM, PPM, SGI, SID, Sun Raster, TGA, TIFF, VICAR, WEBP, and the like.

Digital images may be a variety of image bit depths depending, e.g., on the particular type of image captured (e.g., color or grayscale) and the sensitivity or the digital camera or other image capture device and may include but are not limited to e.g., 8-bit, 10-bit, 12-bit, 14-bit, 16-bit, 18-bit, 24-bit, 30-bit, 36-bit, 48-bit, 64-bit, and the like. In some instances, the channels of a color image may individually be or may be split into individual 8-bit grayscale images. In some instances, the channels of a color image may individually be or may be split into individual 16-bit grayscale images.

Digital images may be binary (e.g., black and white), grayscale or color formats and may be converted between formats by suitable image processing algorithms. For example, a color image may be "split" into individual color channels to produce individual grayscale images for each color channel. For example, a red, green and blue image (RGB) image may be split into individual red, green and blue channels to produce a grayscale image of the red channel, a grayscale image of the green channel and a grayscale image of the blue channel. Color images may be converted between color spaces and split into any convenient and appropriate color channels of a particular color space including but not limited to e.g., RGB color space, CMYK color space, HSV color space, CIE color space, Lab color space, CIELUV color space, YCbCr color space, and the like. Binary images and grayscale images may be applied to a channel of a color image and, e.g., where multiple binary or grayscale images are applied to multiple channels of a color image, a color image may be constructed, or "merged", from binary and/or grayscale images. Where a color image is split into individual color channels to produce grayscale images, an individual grayscale image may be referred to by its prior channel designation, e.g., a grayscale image produced from the red channel may be referred to as "red" in subsequent steps and/or any values generated from the "red" channel may be referred to by their prior channel designation, e.g., the mean "red" intensities refers to the mean intensity values derived from the grayscale image produced from the red channel. Images and values derived from other color spaces may be referred to using corresponding nomenclature.

Accordingly, digital images may be processed as color images or may be converted or split into two or more individual color channels prior to processing. When split into two or more individual color channels prior to processing, any number of the resulting split images may be used in further processing steps including but not limited to all the split images (i.e., all the individual channels of the image) or only one of the split images (i.e., only one of the individual channels of the image) or one or more, including but not limited to two or more, three or more, two, three, etc. of the split images (i.e., the individual channels of the image).

Digital images, e.g., whether color, grayscale, binary, etc., may be segmented prior to processing for feature extraction. As used herein, the terms "segmented" and "segmentation" as they relate to image processing generally refer to the division or partitioning of an image into meaningful structures or segments. Various methods for image segmentation may find use in the methods described herein or in preparation of an image for processing according to the methods as described herein. Selection of a particular segmentation method or combination of segmentation methods will depend on various factors including the type of image captured, the nature of subject matter of the image, the desired result of the image processing, the cellular features to be extracted, etc.

In some instances, image segmentation may make use of one or more of threshold based segmentation, edge based segmentation and region based segmentation. Specific image segmentation methods include but are not limited to thresholding methods, clustering methods, compression-based methods, histogram-based methods, edge detection methods, dual clustering methods, region-growing methods, partial differential equation-based methods (e.g., parametric methods, level set methods, fast marching methods, etc.), variational methods, graph partitioning methods (e.g., Markov Random Fields methods), watershed transformation methods, model based segmentation methods, multi-scale segmentation methods, semi-automatic segmentation methods, trainable segmentation methods, and the like.

Other digital image processing image transformations that may find use in the described methods include but are not limited to e.g., point processing transformations (e.g., negative transform, log transform, inverse log transform, nth root transform, nth power transform, gamma correction, contrast transforms (e.g., contrast stretching), window center correction, histogram equalization, etc.), filtering (i.e., neighbor) transformations (e.g., mean filters, Gaussian filters, median filters, image gradient filters, Laplacian filters, normalized cross correlation (NCC) filters, etc.), and the like.

Following image processing (e.g., image segmentation, image transformation, etc.) an image mask may be generated. As used herein the terms "mask", as related to image processing, and "image mask" collectively refer to spatial filtering of a digital image so as to limit further processing steps to a defined subset or defined portion of the original image. For example, in some instances, a digital image may be segmented to partition one or more regions of interest (ROI) and an image mask may be generated based on the segmented ROI such that further image processing steps are limited only to those pixels contained within the mask defined by the segmented ROI. Various masks may be generated depending on the particular processes to be performed.

In some instances, a digital image may be segmented according to cellular boundaries and a cellular mask may be generated that contains the segmented cells. A cellular mask may limit further image processing step to only those pixels contained within the cellular mask and/or only those cellular structures contained within the cellular mask.

In some instances, a digital image may be segmented according to nuclear boundaries and a nuclear mask may be generated that contains the segmented nuclei. A nuclear mask may limit further image processing step to only those pixels contained within the nuclear mask and/or only those cellular structures contained within the nuclear mask. In some instances, a digital image may be segmented according to or an ROI may be generated based on a subsection of the nucleus of a cell, including but not limited to e.g., one or more nuclear lobes of the nucleus of the cell.

In some instances, a digital image may be segmented according to cytoplasm boundaries and a cytoplasm mask may be generated that contains the segmented cytoplasm of the cells. A cytoplasm mask may limit further image processing step to only those pixels contained within the cytoplasm mask and/or only those cellular structures contained within the cytoplasm mask.

Any useful mask may be generated according to any cellular structure or cellular substructure discernable on the digital image. In some instances, multiple cellular masks may be combined in an image processing step, e.g., such that further image processing steps are confined to those pixels defined by some combination of masks including but not limited to e.g., a combination of cellular and nuclear masks, a combination of nuclear and cytoplasmic masks, a combination of cellular and cytoplasmic masks.

In some instances, two or more different masks may be compared such that image processing steps are performed on each of the two or more different masks and the masks themselves or resultant values therefrom are compared. For example, in some instances a cellular mask may be compared to a nuclear mask, a nuclear mask may be compared to a cytoplasmic mask, a cellular mask may be compared to cytoplasmic mask, etc.

It will be understood that masks are not limited to cellular structures and a mask may be defined for any spatial or non-spatial component of the digital image. For example, in some instances a background mask may be generated including but not limited to e.g., a slide-background mask, which includes all or a portion of the background of the digital image. Non-spatial masks that may be employed include but are not limited to e.g., noise masks, threshold masks, etc.

Following pre-processing of the digital image (e.g., image segmentation, image transformation, etc.) one or more features may be extracted from the digital image and such features may be extracted over a defined region of the digital image, e.g., defined by a mask, defined by a ROI, etc.

Feature Extraction

The instant methods include the extraction of features from digital images where the extracted features provide a calculated value pertaining to one or more cells or one or more portions of a cell. Accordingly, extracted features may pertain to a cell as a whole or various cellular portions including but not limited to cellular portions defined by a structural unit of a cell or cellular portions defined by some other criteria including non-structural criteria.

Structural units of a cell that may be used to define a cellular portion include any subcellular component of the cell resolvable through microscopy, including those resolvable with the assistance of histological staining, including but not limited to the nucleus of the cell, the nuclear membrane of the cell, the nucleolus of the cell, the cytoplasm of the cell, the chromatin of the cell, the heterochromatin of the cell, the euchromatin of the cell, the plasma membrane of the cell, cilia of a cell, granules of the cell, mitochondria of the cell, golgi of the cell, endoplasmic reticulum of the cell, microtubules of the cell, intermediate filaments of the cell, and the like.

Non-structural criteria, as referred to herein, refers to criterial used to define a cellular potion that is not based on an underlying structural component of the cell and/or does not correlated with an underlying structural component of the cell. For example, in some instances, a non-structural criterion may be based or derived from one or more calculated positions or measures of the cell including but not limited to e.g., the center of the cell (e.g., the centroid of the cell), the perimeter of the cell, etc. In some instances, the non-structural criterion may be the calculated position or measure of the cell. In other instances, the non-structural criterion may be based on the calculated position or measure of the cell including e.g., one or more concentric rings (i.e., annuli) calculated from the centroid of the cell, one or more concentric elliptical annuli calculated from the centroid of the cell, one or more concentric irregular annuli (e.g., as derived from the shape of the perimeter of the cell), one or more circles within the cell (e.g., as calculated from the centroid of the cell), one or more semicircles within the cell (e.g., as calculated from the centroid of the cell), one or more sectors of the cell (e.g., circular sectors, or approximation thereof, as calculated from the centroid of the cell), one or more segments of the cell (e.g., circular segments, or approximation thereof, as calculated from the centroid of the cell), and the like.

As will be readily understood, structural units and non-structural units of a cell, including combinations of different structural units, different non-structural units and structural unit and non-structural unit combinations, that may be used to define a cellular portion may, in some instances, also be used to define a ROI as described herein.

In some instances, a portion of a subcellular component (e.g., a portion of the cytoplasm, a portion of the nucleus, a portion of the cell, etc.) may be used to define a mask or an ROI as described herein including, e.g., where the portion of the subcellular component is some percentage of a cellular structure including but not limited to e.g., 1%, 2%, 3%, 4%, 5%, 6%, 7%, 8%, 9%, 10%, 11%, 12%, 13%, 14%, 15%, 16%, 17%, 18%, 19%, 20%, 25%, 30%, 35%, 40%, 45%, 50%, 55%, 60%, 65%, 70%, 75%, 80%, 85%, 90%, 95%, 100%, etc., of the subcellular component.

The instant methods involve the extraction of stain-independent features where such stain independent features are those that are not affected by variations in histological stains, histological staining, and characteristics thereof including but not limited to e.g., stain intensity, stain chromaticity, etc. In some instances, stain-independent features may also be independent of stain quality, presuming the variation in stain quality is not so poor as to limit the detection of cellular features using the methods as described herein.

Without being bound by theory, it was discovered that certain cellular characteristics could be measured and cellular features could be calculated from the measured cellular characteristics that are stain independent. It was found that any variation in the cellular characteristics due to variability in the histological staining remained proportional between cellular characteristics. For example, when two cellular characteristics (e.g., the color of the cytoplasm and the color of the nucleus) varied between two differently stained specimens due to a variation in the histological stain (e.g., one stain was more intense than the other), the variation between the two cellular characteristics was proportional (e.g., the difference between the color of the cytoplasm and the color of the nucleus in the first stain preparation was proportional to the difference between the color of the cytoplasm and the color of the nucleus in the second stain preparation). Such proportionality was discovered between different cellular features, between cellular features and non-cellular features, between cellular features and cell population features and the like. It was also discovered that the proportionality between cellular features not affected by variation, including e.g., shape (e.g., contour) features, texture features, invariant moment features, etc., could be used as stain-independent cellular features.

Accordingly, cellular stain-independent features include those cellular features that are not affected by variations in histological staining including but not limited to e.g., color features, lightness features, contour features, invariant moment features, image texture features and the like.

In some instances, stain-independent features that may be extracted from a digital image of histologically stained cells include color features. For example, in some instances, color features may be extracted over one or more cellular masks or an ROI that includes the entirety of a cell or essentially the entire cell. In some instances, color features may be extracted over one or more masks of a cellular portion (including cell structure defined and non-structurally defined portions) or an ROI that includes one or more cellular portions (e.g., the cytoplasm of the cell, the nucleus of the cell, etc.). In some instances, color features may be extracted over one or more non-cellular portions of a digital image (including but not limited to e.g., the background of the image). In some instances, color features may be extracted over one or more masks or one or more ROIs that include a population of cells or a portion thereof.

Color features that may be extracted include but are not limited to any calculable value from the color information contained in the digital image and/or over any mask applied to the image including e.g., the mean intensity of one or more color channels (e.g., the mean intensity of the red channel, the mean intensity of the green channel, the mean intensity of the blue channel, etc.), the median intensity of one or more color channels (e.g., the median intensity of the red channel, the median intensity of the green channel, the median intensity of the blue channel, etc.), the maximum intensity of one or more color channels (e.g., the maximum intensity of the red channel, the maximum intensity of the green channel, the maximum intensity of the blue channel, etc.), the minimum intensity of one or more color channels (e.g., the minimum intensity of the red channel, the minimum intensity of the green channel, the minimum intensity of the blue channel, etc.), and the like.

In some instances, a color value may be calculated over a predefined range including but not limited to e.g., the top 90% of intensities for one or more color values (including but not limited to the top 80% of intensity values, the top 70% of intensity values, the top 60% of intensity values, the top 50% of intensity values, the top 40% of intensity values, the top 30% of intensity values, the top 20% of intensity values, the top 10% of intensity values, the top 9% of intensity values, the top 8% of intensity values, the top 7% of intensity values, the top 6% of intensity values, the top 5% of intensity values, the top 4% of intensity values, the top 3% of intensity values, the top 2% of intensity values, the top 1% of intensity values, etc.).

In some instances, a color value may be calculated over a predefined range including but not limited to e.g., the bottom 90% of intensities for one or more color values (including but not limited to the bottom 80% of intensity values, the bottom 70% of intensity values, the bottom 60% of intensity values, the bottom 50% of intensity values, the bottom 40% of intensity values, the bottom 30% of intensity values, the bottom 20% of intensity values, the bottom 10% of intensity values, the bottom 9% of intensity values, the bottom 8% of intensity values, the bottom 7% of intensity values, the bottom 6% of intensity values, the bottom 5% of intensity values, the bottom 4% of intensity values, the bottom 3% of intensity values, the bottom 2% of intensity values, the bottom 1% of intensity values, etc.).

In some instances, a color value may be calculated over a predefined range including but not limited to e.g., the middle 90% of intensities for one or more color values (including but not limited to the middle 80% of intensity values, the middle 70% of intensity values, the middle 60% of intensity values, the middle 50% of intensity values, the middle 40% of intensity values, the middle 30% of intensity values, the middle 20% of intensity values, the middle 10% of intensity values, the middle 9% of intensity values, the middle 8% of intensity values, the middle 7% of intensity values, the middle 6% of intensity values, the middle 5% of intensity values, the middle 4% of intensity values, the middle 3% of intensity values, the middle 2% of intensity values, the middle 1% of intensity values, etc.).

In some instances, a color value may be calculated over a range defined by the intensity values of the image including but not limited to e.g., the dynamic range of intensity values of the image, etc.

In some instances, stain-independent features that may be extracted from a digital image of histologically stained cells include lightness features. For example, in some instances, lightness features may be extracted over one or more cellular masks or an ROI that includes the entirety of a cell or essentially the entire cell. In some instances, lightness features may be extracted over one or more masks of a cellular portion (including cell structure defined and non-structurally defined portions) or an ROI that includes one or more cellular portions (e.g., the cytoplasm of the cell, the nucleus of the cell, etc.). In some instances, lightness features may be extracted over one or more non-cellular portions of a digital image (including but not limited to e.g., the background of the image). In some instances, lightness features may be extracted over one or more masks or one or more ROIs that include a population of cells or a portion thereof.

Lightness features that may be extracted include but are not limited to any calculable value from the lightness or color-independent intensity information contained in the digital image and/or over any mask applied to the image including e.g., the mean lightness (e.g., the mean lightness of all the channels of the image, the mean lightness of a brightness channel of a digital image (e.g., as used in HSV color space), the mean lightness as a result of a transparency channel of a digital image (e.g., an alpha channel), etc.), the median lightness (e.g., the median lightness of all the channels of the image, the median lightness of a brightness channel of a digital image (e.g., as used in HSV color space), the median lightness as a result of a transparency channel of a digital image (e.g., an alpha channel), etc.), the maximum lightness (e.g., the maximum lightness of all the channels of the image, the maximum lightness of a brightness channel of a digital image (e.g., as used in HSV color space), the maximum lightness as a result of a transparency channel of a digital image (e.g., an alpha channel), etc.), the minimum lightness (e.g., the minimum lightness of all the channels of the image, the minimum lightness of a brightness channel of a digital image (e.g., as used in HSV color space), the minimum lightness as a result of a transparency channel of a digital image (e.g., an alpha channel), etc.), and the like.

Color-independent intensity may include but are not limited to e.g., the overall (i.e., combined) intensities of all the color channels of a color image, the intensity values of a colorless grayscale image, the brightness of an image irrespective of any color features of the image, etc.

In some instances, a lightness value may be calculated over a predefined range including but not limited to e.g., the top 90% of intensities for one or more color values (including but not limited to the top 80% of intensity values, the top 70% of intensity values, the top 60% of intensity values, the top 50% of intensity values, the top 40% of intensity values, the top 30% of intensity values, the top 20% of intensity values, the top 10% of intensity values, the top 9% of intensity values, the top 8% of intensity values, the top 7% of intensity values, the top 6% of intensity values, the top 5% of intensity values, the top 4% of intensity values, the top 3% of intensity values, the top 2% of intensity values, the top 1% of intensity values, etc.).

In some instances, a lightness value may be calculated over a predefined range including but not limited to e.g., the bottom 90% of intensities for one or more color values (including but not limited to the bottom 80% of intensity values, the bottom 70% of intensity values, the bottom 60% of intensity values, the bottom 50% of intensity values, the bottom 40% of intensity values, the bottom 30% of intensity values, the bottom 20% of intensity values, the bottom 10% of intensity values, the bottom 9% of intensity values, the bottom 8% of intensity values, the bottom 7% of intensity values, the bottom 6% of intensity values, the bottom 5% of intensity values, the bottom 4% of intensity values, the bottom 3% of intensity values, the bottom 2% of intensity values, the bottom 1% of intensity values, etc.).

In some instances, a lightness value may be calculated over a predefined range including but not limited to e.g., the middle 90% of intensities for one or more color values (including but not limited to the middle 80% of intensity values, the middle 70% of intensity values, the middle 60% of intensity values, the middle 50% of intensity values, the middle 40% of intensity values, the middle 30% of intensity values, the middle 20% of intensity values, the middle 10% of intensity values, the middle 9% of intensity values, the middle 8% of intensity values, the middle 7% of intensity values, the middle 6% of intensity values, the middle 5% of intensity values, the middle 4% of intensity values, the middle 3% of intensity values, the middle 2% of intensity values, the middle 1% of intensity values, etc.).

In some instances, a lightness value may be calculated over a range defined by the intensity values of the image including but not limited to e.g., the dynamic range of intensity values of the image, etc.

In some instances, e.g., as used with red blood cells, lightness values may relate to "pallor" of a cell or a portion thereof, including e.g., the pallor of a RBC, the central pallor of a RBC, the pallor of a portion of a RBC, etc. Pallor, as a cellular feature, may be calculated over the entirety of a cell or essentially an entire cell. In some instances, pallor may be calculated as it relates to a position relative to the centroid of the cell. For example, in some instances, pallor may be calculated for a circle centered on the centroid of the cell where the size of the circle may vary depending on the particular cellular feature to be extracted. As such, the size of a circle centered on the centroid of the cell from which pallor may be calculated includes but is not limited to a circle having 100% or less of the minimum, maximum, mean or median diameter of the cell including e.g., 95% or less, 90% or less, 85% or less, 80% or less, 75% or less, 70% or less, 65% or less, 60% or less, 55% or less, 50% or less, 45% or less, 40% or less, 35% or less, 30% or less, 25% or less, 20% or less, 15% or less, 10% or less, 5% or less, etc., with a minimum of about 1% of the minimum, maximum, mean or median diameter of the cell.

In some instances, the size of a circle centered on the centroid of the cell from which pallor may be calculated includes but is not limited to a circle having a diameter between 100% and 1% of the minimum, maximum, mean or median diameter of the cell including e.g., between 100% and 5%, between 100% and 10%, between 100% and 15%, between 100% and 20%, between 100% and 25%, between 100% and 30%, between 100% and 35%, between 100% and 40%, between 100% and 45%, between 100% and 50%, between 100% and 55%, between 100% and 60%, between 100% and 65%, between 100% and 70%, between 100% and 75%, between 100% and 80%, between 100% and 85%, between 100% and 90%, between 100% and 95%, between 95% and 1%, between 90% and 1%, between 85% and 1%, between 80% and 1%, between 75% and 1%, between 70% and 1%, between 65% and 1%, between 60% and 1%, between 55% and 1%, between 50% and 1%, between 45% and 1%, between 40% and 1%, between 35% and 1%, between 30% and 1%, between 25% and 1%, between 20% and 1%, between 15% and 1%, between 10% and 1%, between 5% and 1%, between 95% and 5%, between 90% and 10%, between 85% and 15%, between 80% and 20%, between 75% and 25%, between 70% and 30%, between 65% and 35%, between 60% and 40%, between 55% and 45%, of the minimum, maximum, mean or median diameter of the cell.

In some instances, pallor may be calculated for a ring (i.e., an annulus, including circular, elliptical and irregular annuli) centered on the centroid of the cell where the size of the ring may vary depending on the particular cellular feature to be extracted. The area of a circular ring may be defined by the following equation:

$$Area = \pi(R^2 - r^2)$$

Where R is the outer radius and r is the inner radius. An ordinary artisan will understand how the foregoing equation may be modified to account for an elliptical and/or an irregular annulus.

As such, a ring centered on the centroid of the cell from which pallor may be calculated includes but is not limited to a ring having an outer radius of 100% or less of the minimum, maximum, mean or median radius of the cell including e.g., 95% or less, 90% or less, 85% or less, 80% or less, 75% or less, 70% or less, 65% or less, 60% or less, 55% or less, 50% or less, 45% or less, 40% or less, 35% or less, 30% or less, 25% or less, 20% or less, 15% or less, 10% or less, 5% or less, etc., with a minimum of about 1% greater than the inner radius of the ring.

As such, a ring centered on the centroid of the cell from which pallor may be calculated includes but is not limited to a ring having an inner radius of less than 100% of the minimum, maximum, mean or median radius of the cell including e.g., 95% or less, 90% or less, 85% or less, 80% or less, 75% or less, 70% or less, 65% or less, 60% or less, 55% or less, 50% or less, 45% or less, 40% or less, 35% or less, 30% or less, 25% or less, 20% or less, 15% or less, 10% or less, 5% or less, etc., with a minimum of about 1% of the minimum, maximum, mean or median radius of the cell and a maximum of about 1% less than the outer radius of the ring.

In some instances, a ring centered on the centroid of the cell from which pallor may be calculated may be described as having a "relative diameter" where the diameter of the ring (defined as the midpoint between the outer and inner diameter of the ring) is described relative to the minimum, maximum, mean or median diameter of the cell. The relative diameter of a ring centered on the centroid of the cell from which pallor may be calculated (i.e., a pallor ring) will vary and may range from about 99% to about 1% or less of the minimum, maximum, mean or median diameter of the cell, including but not limited to e.g., 99% of the diameter of the cell, 98% of the diameter of the cell, 97% of the diameter of the cell, 96% of the diameter of the cell, 95% of the diameter of the cell, 94% of the diameter of the cell, 93% of the diameter of the cell, 92% of the diameter of the cell, 91° A of the diameter of the cell, 90% of the diameter of the cell, 89% of the diameter of the cell, 88% of the diameter of the cell, 87% of the diameter of the cell, 86% of the diameter of the cell, 85% of the diameter of the cell, 84% of the diameter of the cell, 83% of the diameter of the cell, 82% of the diameter of the cell, 81% of the diameter of the cell, 80% of the diameter of the cell, 79% of the diameter of the cell, 78% of the diameter of the cell, 77% of the diameter of the cell, 76% of the diameter of the cell, 75% of the diameter of the cell, 74% of the diameter of the cell, 73% of the diameter of the cell, 72% of the diameter of the cell, 71% of the diameter of the cell, 70% of the diameter of the cell, 69% of the diameter of the cell, 68% of the diameter of the cell, 67% of the diameter of the cell, 66% of the diameter of the cell, 65% of the diameter of the cell, 64% of the diameter of the cell, 63% of the diameter of the cell, 62% of the diameter of the cell, 61% of the diameter of the cell, 60% of the diameter of the cell, 59% of the diameter of the cell, 58% of the diameter of the cell, 57% of the diameter of the cell, 56% of the diameter of the cell, 55% of the diameter of the cell, 54% of the diameter of the cell, 53% of the diameter of the cell, 52% of the diameter of the cell, 51° A of the diameter of the cell, 50% of the diameter of the cell, 49% of the diameter of the cell, 48% of the diameter of the cell, 47% of the diameter of the cell, 46% of the diameter of the cell, 45% of the diameter of the cell, 44% of the diameter of the cell, 43% of the diameter of the cell, 42% of the diameter of the cell, 41% of the diameter of the cell, 40% of the diameter of the cell, 39% of the diameter of the cell, 38% of the diameter of the cell, 37% of the diameter of the cell, 36% of the diameter of the cell, 35% of the diameter of the cell, 34% of the diameter of the cell, 33% of the diameter of the cell, 32% of the diameter of the cell, 31% of the diameter of the cell, 30% of the diameter of the cell, 29% of the diameter of the cell, 28% of the diameter of the cell, 27% of the diameter of the cell, 26% of the diameter of the cell, 25% of the diameter of the cell, 24% of the diameter of the cell, 23% of the diameter of the cell, 22% of the diameter of the cell, 21% of the diameter of the cell, 20% of the diameter of the cell, 19% of the diameter of the cell, 18% of the diameter of the cell, 17% of the diameter of the cell, 16% of the diameter of the cell, 15% of the diameter of the cell, 14% of the diameter of the cell, 13% of the diameter of the cell, 12% of the diameter of the cell, 11% of the diameter of the cell, 10% of the diameter of the cell, 9% of the diameter of the cell, 8% of the diameter of the cell, 7% of the diameter of the cell, 6% of the diameter of the cell, 5% of the diameter of the cell, 4% of the diameter of the cell, 3% of the diameter of the cell, 2% of the diameter of the cell, 1% of the diameter of the cell, etc., where the diameter may be the minimum, maximum, mean or median diameter of the cell.

The size of a ring having a relative diameter may also be described relative to the cell, where the width of the ring (e.g., as defined as the difference between the outer diameter and the inner diameter) may vary depending on the particular feature calculated and may range from about 1% of the diameter of the cell to about 99% of the diameter of the cell including but not limited to e.g., from about 1% to about 95%, from about 1% to about 90%, from about 1% to about 85%, from about 1% to about 80%, from about 1% to about 75%, from about 1% to about 70%, from about 1% to about 65%, from about 1% to about 60%, from about 1% to about 55%, from about 1% to about 50%, from about 1% to about 45%, from about 1% to about 40%, from about 1% to about 35%, from about 1% to about 30%, from about 1% to about 25%, from about 1% to about 20%, from about 1% to about 15%, from about 1% to about 10%, from about 1% to about 5%, from about 1% to about 0%, from about 1% to about 95%, from about 5% to about 95%, from about 10% to about 95%, from about 15% to about 95%, from about 20% to about 95%, from about 25% to about 95%, from about 30% to about 95%, from about 35% to about 95%, from about 40% to about 95%, from about 45% to about 95%, from about 50% to about 95%, from about 55% to about 95%, from about 60% to about 95%, from about 65% to about 95%, from about 70% to about 95%, from about 75% to about 95%, from about 80% to about 95%, from about 85% to about 95%, from about 90% to about 95%, from about 5% to about 10%, from about 10% to about 15%, from about 15% to about 20%, from about 20% to about 25%, from about 25% to about 30%, from about 30% to about 35%, from about 35% to about 40%, from about 40% to about 45%, from about 45% to about 50%, from about 50% to about 55%, from about 55% to about 60%, from about 60% to about 65%, from about 65% to about 70%, from about 70% to about 75%, from about 75% to about 80%, from about 80% to about 85%, from about 85% to about 90%, from about 90% to about 95%, from about 95% to about 100%, and the like.

The number of pallor rings used in deriving a lightness feature of a cell may range from 1 to 100 or more including but not limited to e.g., 1 to 50, 1 to 25, 1 to 20, 1 to 15, 1 to 10, 1 to 5, 1 to 4, 1 to 3, 1 to 2, 1, 2, 3, 4, 5, 6, 7, 8, 9, 10, 11, 12, 13, 14, 15, 16, 17, 18, 19, 20, 25, 30, 35, 40, 45, 50, 55, 60, 65, 70, 75, 80, 85, 90, 95, 100, etc. In some instances, a lightness feature may be calculated as a sequence of pallor rings where any appropriate and useful sequence of rings of varying sizes may be used including e.g., any sequence of pallor rings herein described. Where a sequence of pallor rings is employed to generate a lightness feature a plurality of pallor rings can be combined, e.g., into a single value. For example, in some instances, a calculated lightness feature of the minimum or maximum pallor may be derived from a plurality of pallor rings (e.g., as exemplified in FIG. 3A-3C). In other instances, any other useful and appropriate statistic that may be calculated from a plurality of pallor rings may be employed, including but not limited to e.g., second derivatives, integrals, etc.

In some instances, a statistic calculated from a plurality of pallor rings may include where no difference or change or progression in density gradient is present between the rings of the plurality. For example, in some instances, the rings of the plurality will have essentially equal density and/or the density gradient (e.g., across the cell or from ring to ring) may be essentially linear (e.g., may essentially not have a density minimum or maximum).

In some instances, the density gradient as a whole (e.g., as calculated from a plurality of pallor rings) may serve as a feature according to the methods of the instant disclosure, including but not limited to e.g., where the density gradient as a whole has at least a minimum and a maximum or where the density gradient is essentially linear, as described above. As such, in some instances, the density gradient of an ROI as a whole may find use as a stain-independent feature of the instant method.

In some instances, stain-independent features that may be extracted from a digital image of histologically stained cells include shape (e.g., contour) features. For example, in some instances, shape (e.g., contour) features may be extracted over one or more cellular masks or an ROI that includes the entirety of a cell or essentially the entire cell. In some instances, shape (e.g., contour) features may be extracted over one or more masks of a cellular portion (including cell structure defined and non-structurally defined portions) or an ROI that includes one or more cellular portions (e.g., the cytoplasm of the cell, the nucleus of the cell, etc.). In some instances, shape (e.g., contour) features may be extracted over one or more masks or one or more ROIs that include a population of cells or a portion thereof.

Shape or contour features that may be extracted include but are not limited to any shape or contour value calculable from the spatially arrayed information contained in the digital image and/or over any mask applied to the image including e.g., perimeter, convex hull perimeter, maximal convexity depth, average convexity depth, area, convex hull area, circularity, convexity and combinations thereof.

In some instances, stain-independent features that may be extracted from a digital image of histologically stained cells include invariant moment features. For example, in some instances, invariant moment features may be extracted over one or more cellular masks or an ROI that includes the entirety of a cell or essentially the entire cell. In some instances, invariant moment features may be extracted over one or more masks of a cellular portion (including cell structure defined and non-structurally defined portions) or an ROI that includes one or more cellular portions (e.g., the cytoplasm of the cell, the nucleus of the cell, etc.). In some instances, invariant moment features may be extracted over one or more masks or one or more ROIs that include a population of cells or a portion thereof.

Invariant moment features that may be extracted include but are not limited to any invariant moment value calculable from the spatially arrayed information contained in the digital image and/or over any mask applied to the image including e.g., one or more scale invariant moments, one or more rotation invariant moments (e.g., Hu moments), and the like.

In some instances, stain-independent features that may be extracted from a digital image of histologically stained cells include image texture features. For example, in some instances, image texture features may be extracted over one or more cellular masks or an ROI that includes the entirety of a cell or essentially the entire cell. In some instances, image texture features may be extracted over one or more masks of a cellular portion (including cell structure defined and non-structurally defined portions) or an ROI that includes one or more cellular portions (e.g., the cytoplasm of the cell, the nucleus of the cell, etc.). In some instances, image texture features may be extracted over one or more non-cellular portions of a digital image (including but not limited to e.g., the background of the image). In some instances, image texture features may be extracted over one or more masks or one or more ROIs that include a population of cells or a portion thereof.

Image texture features that may be extracted include but are not limited to any image texture value calculable from the spatially arrayed information contained in the digital image and/or over any mask applied to the image. Image texture features may be calculated according to a variety of different image texture models including but not limited to e.g., fractal models, autoregressive models, fractional differencing models, Markov random fields, and the like. Image texture features may be calculated according to a variety of different non-model-based texture features including but not limited to e.g., co-occurrence matrices, grey-level sum and difference histograms, Laws' masks, frequency domain methods, Gabor filters, and the like.

In some instances, feature extraction may include the use of non-cellular features, e.g., where a non-cellular feature is compared to a cellular feature. Useful non-cellular features will vary and may include any non-cellular component of the image which may correspond to any non-cellular component of the specimen or slide including but not limited to e.g., the background of the image or slide, the edge of the slide or image thereof, the edge of the coverslip or image thereof, etc.

The instant method includes the use of ratios of features, including ratios of cellular features and ratios of cellular features with non-cellular features. Any two features may find use in a ratio as described herein to provide for the extraction of a stain-independent feature provided the selected features are proportionally affected by variations in the stain or are unaffected by variations in the stain as described herein. For example, in some instances, the ratio of two color features (including e.g., the ratio between two color features of two different color channels) may be used. In some instances, the ratio of two lightness features (including e.g., the ratio between two different pallors, including e.g., two different pallor rings) may be used. In some instances, the ratio of two contour features (including e.g., the ratio between two contour features of two different subcellular structures) may be used. In some instances, the ratio of two invariant moment features (including e.g., the ratio between two different rotation invariant moment features) may be used. In some instances, the ratio of two image texture features (including e.g., the ratio between two different image texture features calculated according to the same or different image texture feature models) may be used.

In some instances, a plurality of features, including but not limited to any combination of one or more color features, one or more lightness features, one or more contour features, one or more invariant moment features, one or more image texture features or a plurality color features, a plurality lightness features, a plurality contour features, a plurality invariant moment features, a plurality image texture features may find use in extracting a stain-independent feature as described herein.

In some instances, stain-independent features that may be extracted from a digital image of histologically stained cells include population features. For example, in some instances, population features may be extracted over one or more cellular masks or an ROI that includes a plurality of cells. In some instances, population features may be extracted over one or more masks of a cellular portion (including cell structure defined and non-structurally defined portions) or an ROI that includes cellular portions (e.g., the cytoplasm of the cell, the nucleus of the cell, etc.) for a plurality of cells.

Population features that may be extracted include but are not limited to e.g., those extracted for all the cells of a population, the majority of the cells of a population, all the cells of a population present in a particular specimen, all the cells of a population present in a particular region of the specimen or slide, etc. Any appropriate cell population may find use in extracting a stain-independent feature including where the cell population is defined according to cell size, the presence or absence of a nucleus, cell staining intensity, the type of cell (e.g., a red blood cell, a white blood cell, etc.).

As will be readily understood, in instances where features are extracted for a particular cell type population, cell classification may need to be performed prior to extraction of the population features (e.g., to assign cell types in order to define the population), including e.g., where a first non-population feature is extracted to allow for the performance of cell classification and the population feature is extracted based on the cell classification based on the first feature. Any cellular feature, including e.g., those described herein may be used in generating a population feature for a plurality of cells for which the cellular feature is determined.

Accordingly, feature extraction as described herein may be performed once prior to a feature-based assessment or may be performed iteratively, e.g., where feature extraction is performed followed by feature-based assessment based on the feature extraction followed by one or more rounds of feature extraction (e.g., where the subsequent rounds of feature extraction may involve extraction of the same or different features as compared to the initially extracted feature).

Feature Based Assessments

The instant methods include assessments of the cells of histologically stained specimen that are made based on stain-independent features extracted from a digital image of the specimen. Such assessments will vary depending, e.g., on the type of specimen and the purpose of the assessment. For example, in some instances, cell morphology may be assessed.

Assessments of cellular morphology from a digital image of a histologically stained specimen may be performed for various purposes including but not limited to e.g., making a determination about a cell of the specimen, e.g., to determine whether the cell of specimen is normal, to determine whether the cell of the specimen is abnormal, to determine the identity of the cell of the specimen, to determine the relative numbers of cells of various types within the specimen, etc. In general, cellular morphology assessments according to the methods described herein will include extracting a stain-independent feature from a digital image of the specimen and comparing the extracted stain-independent feature to a corresponding reference value to make a determination about the cell.

In some instances, a determination about a cell of the specimen is made to determine whether the cell of specimen is normal or abnormal. For example, in some instances, from a digital image of a specimen, a first cellular feature (including e.g., a color feature, a lightness feature, a contour feature, an invariant moment features, an image texture feature, etc.) is extracted and a second feature (including e.g., a cellular feature, a non-cellular feature, a population feature, etc.) is extracted and the first and second features are used to generate a stain-independent feature for the cell, e.g., as described herein. The generated stain-independent feature is compared to a reference value that corresponds to the stain-independent feature to determine whether the subject cell is normal or abnormal.

In some instances, a determination about a cell of the specimen is made to determine the identity of the cell of the specimen. For example, in some instances, from a digital image of a specimen, a first cellular feature (including e.g., a color feature, a lightness feature, a contour feature, an invariant moment features, an image texture feature, etc.) is extracted and a second feature (including e.g., a cellular feature, a non-cellular feature, a population feature, etc.) is extracted and the first and second features are used to generate a stain-independent feature for the cell, e.g., as described herein. The generated stain-independent feature is compared to a reference value that corresponds to the stain-independent feature to determine the identity of the subject cell. In some instances, after the identity of a plurality of cells are determined the cells may be quantified, e.g., so as to arrive at a cell count of the sample, i.e., a quantification of the relative numbers of cells of various types of the sample.

Reference values for a stain-independent feature may vary depending on the particular feature and may include but are not limited to e.g., target values, ranges, thresholds, etc. For example, in some instance a reference value may be a target value or may include a plurality of target values such that a generated or extracted stain-independent feature is compared to the target value or plurality of target values to determine if a match is found, e.g., if the measured value matches one or more of the target values. In some instances, when the comparison reveals a match the subject cell is determined to be normal. In other instances, when the comparison reveals a match the subject cell is determined to be abnormal. In yet other instances, when the comparison fails to reveal a match the subject cell is determined to be abnormal. In yet other instances, when the comparison fails to reveal a match the subject cell is determined to be normal. Accordingly, a target value may be a target value for detecting one or more normal cells or a target for detecting one or more abnormal cells.

In some instance a reference value may be a target range or may include a plurality of target ranges such that a generated or extracted stain-independent feature is compared to the target range or plurality of target ranges to determine if the value of the extracted stain-independent feature is within the range. In some instances, when the comparison reveals that the value of the extracted stain-independent feature is within the range the subject cell is determined to be normal. In other instances, when the comparison reveals that the value of the extracted stain-independent feature is within the range the subject cell is determined to be abnormal. In yet other instances, when the comparison reveals that the value of the extracted stain-independent feature is outside the range the subject cell is determined to be abnormal. In yet other instances, when the comparison reveals that the value of the extracted stain-independent feature is outside the range the subject cell is determined to be normal. Accordingly, a target range may be a target range for detecting one or more normal cells or a target range for detecting one or more abnormal cells.

In some instances a reference value may be a threshold or may include a plurality of thresholds such that a generated or extracted stain-independent feature is compared to the threshold or plurality of thresholds to determine if the value of the extracted stain-independent feature is above or below the threshold. In some instances, when the comparison reveals that the measured value is above the threshold the subject cell is determined to be normal. In other instances, when the comparison reveals that the measured value is above the threshold the subject cell is determined to be abnormal. In yet other instances, when the comparison reveals that the measured value is below the threshold the subject cell is determined to be abnormal. In yet other instances, when the comparison reveals that the measured value is below the threshold the subject cell is determined to be normal. Accordingly, a threshold may be a threshold for detecting one or more normal cells or a threshold for detecting one or more abnormal cells based on whether the corresponding determination requires that the value is above or below the threshold.

Reference values for a stain-independent feature including e.g., target values, ranges, thresholds, etc., may be determined by a variety of methods. For example, in some instances, reference values for the stain-independent feature may be generated by calculating the stain-independent feature for a known sample, e.g., a control sample, a sample of known normal cells, a sample of known healthy cells, a sample of known abnormal cells, a sample of known unhealthy cells (e.g., known diseased cells), etc. Reference values may be predetermined, e.g., generated or calculated prior to performing an assessment as described herein, or may be assessment-specific, e.g., generated or determined during the assessment including but not limited to e.g., generated or determined from a the cells of the specimen.

In some instances, assessment-specific reference values may be based on a population of identified cells of the specimen, e.g., a population of normal cells identified in the specimen. In some instances, assessment-specific reference values may be based on a statistical characterization of the cells of the specimen or a population thereof. For example, in some instances, a population of cells of the sample may be statistically characterized, e.g., the distribution of the population may be determined, the mean of the population may be determined, the median of the population may be determined, etc., to generate a reference value for a particular assessment.

In some instances, a predetermined reference value may be determined from a control sample prior to the assessment. In other instances, a predetermined reference value may be determined and may be stored, e.g., stored electronically on a computer readable medium or a computer memory, for use in an assessment as described herein.

The assessments described herein may be cell type non-specific or cell type specific. For example, a stain-independent feature of the subject methods may be generally applied to all cell types of a specimen, including but not limited to e.g., all cell types of a hematological sample. Accordingly, a reference value useful in an assessment as described herein may be a cell type non-specific reference value.

In some instances, a stain-independent feature of the subject methods may be applied only to one or more specific cell types of a specimen, including but not limited to e.g., one or more specific cell types of a hematological sample. Accordingly, a reference value useful in an assessment as described herein may be a cell type specific reference value.

In some instances, cell type specific stain-independent features may include but are not limited to white blood cell specific stain-independent features, nucleated red blood cell specific stain-independent features, giant platelet specific stain-independent features, etc. In some instances, white blood cell, nucleated red blood cell or giant platelet and the stain independent cellular features may include one or more features including but not limited to e.g., a contour feature, an invariant moment feature, an image texture feature, a nuclear lobe feature, a ratio of two cellular color features, a ratio of a cellular color feature and a non-cellular color feature, and combinations thereof.

In some instances, cell type specific stain-independent features may include but are not limited to red blood cell specific stain-independent features. In some instances, red blood cell stain independent cellular features may include one or more features including but not limited to e.g., a contour feature, an invariant moment feature, an image texture feature, an optical density feature, a lightness feature, and combinations thereof.

Assessments according to the methods described herein, including cell morphology assessments, may be performed for a variety of purposes. In some instances, stain-independent features may be extracted and cell morphology assessments may be performed as a means of classifying cells. Cell classifications may be performed for a variety of purposes including but not limited to e.g., as part of an automated image analysis workflow, as part of automated image analysis computer training, as a means to identify normal and/or abnormal cells of a specimen (e.g., as part of a screening procedure, as part of diagnosis, as part of a prognosis, etc.), as a means to quantify normal and/or abnormal cells of a specimen (e.g., as part of a screening procedure, as part of diagnosis, as part of a prognosis, etc.), etc.

Figure 4:
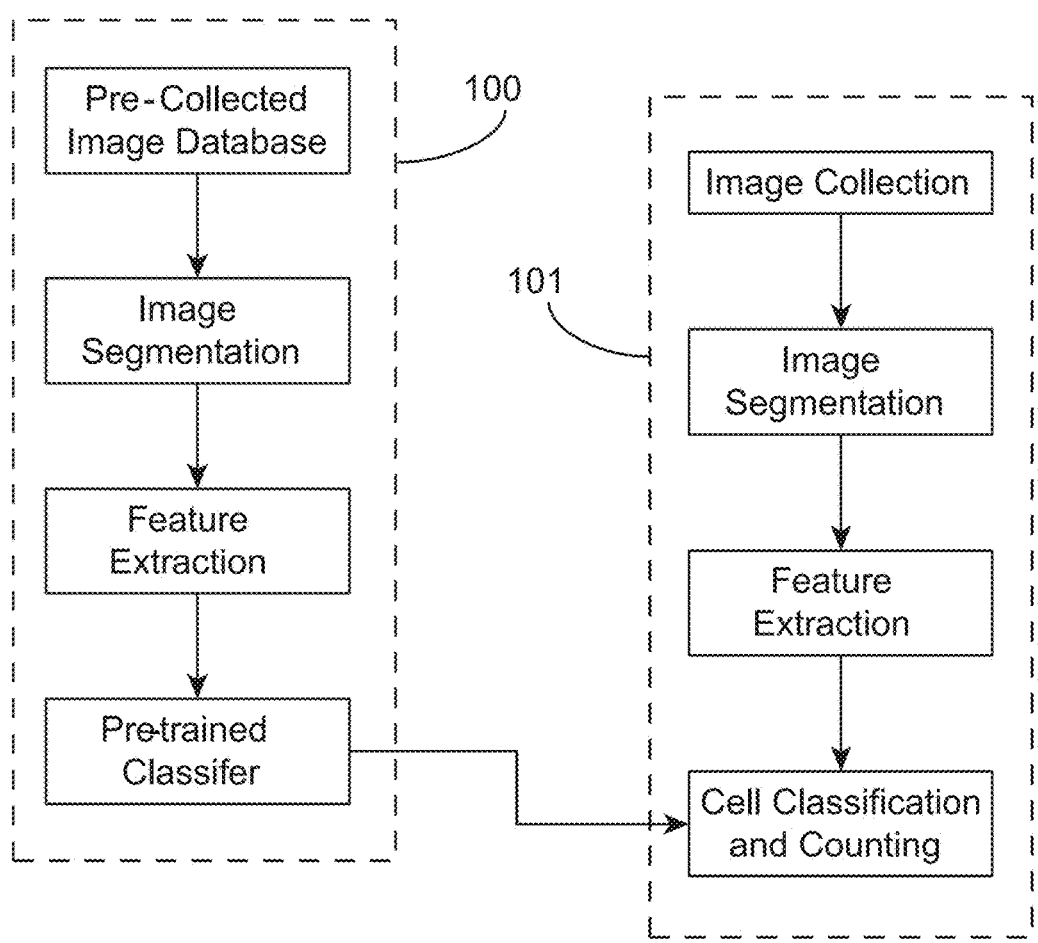
FIG. 4 provides a schematic diagram of a stain-independent feature extraction workflow for cell classification and counting according to one embodiment.

Turning to FIG. 4, in one embodiment, stain-independent feature extraction may be performed as part of a machine training workflow (100), where a set of pre-collected training images of histologically stained specimens are segmented prior to feature extraction. The result of the machine training workflow following feature extraction is a classifier ("pre-trained classifier") that may be used in subsequent cell classification assessments. For example, in one embodiment, stain-independent feature extraction may be performed as part of a production stage automated cellular assessment (101), where images are collected of histologically stained specimens obtained from subjects, the images are segmented and stain-independent feature extraction is performed and utilized in subsequent cell classification and/or cell counting. In some instances, a classifier generated in a machine training workflow (100) may be applied to the cell classification and/or cell counting of a production stage automated cellular assessment (101).

In some instances, a production stage automated cellular assessment may be an automated cellular assessment made as part of an automated histology analysis system, e.g., performed within an automated histology analyzer. In some instances, an automated cellular assessment made as part of an automated histology analysis system may be an automated blood cell assessment made as part of an automated hematology analysis system, e.g., performed within an automated hematology analyzer. Production stage assessments may make use of pre-prepared specimen slides or slide preparation may be integrated into the automated histology analysis, e.g., automated hematology analysis.

Specimens

The instant methods include extracting stain-independent features from histologically stained specimens. Histologically stained specimens include those biological samples and/or bodily fluids prepared with histological stains for analysis of cell morphology. In some instances, histologically stained specimens include but are not limited to hematological samples prepared from blood and containing cell types or elements that could be found in blood including but not limited to nucleated blood cells, enucleated blood cells, white blood cells, nucleated red blood cells, red blood cells, giant platelets, leukocytes, basophils, eosinophils, lymphocytes, monocytes, neutrophils, platelets, mature or immature blood cells, malignant or tumor cells, parasites, bacteria, etc.

In some instances, methods described herein may include preparing a histologically stained specimen from a subject where the specimen contains histologically stain cells or is prepared to include histologically stain cells. In other instances, the specimen may be previously prepared and the method may include processing a digital image obtained from a histologically stained specimen from a subject.

As used herein, histology stains refer to those stains used in microscopic analysis of the cellular anatomy and/or morphology of cells obtained from a multicellular organism. Histology stains generally include at least one dye that stains one or more cell types and/or components of one or more cell types a contrasting color. Histology stains may also include at least one counter-stain that stains the rest of the cells or the rest of the cell a different color. Histological techniques, stains and staining methods are well-known and include but are not limited to those described in Kierman. Histological and histochemical methods: Theory and practice. Oxford: Butterworth/Heinemann, 1999 and Bancroft & Stevens. Theory and practice of histological techniques. New York, N.Y.: Churchill Livingstone, 1996; the disclosures of which are incorporated herein by reference in their entirety.

Histological staining techniques can be specific, staining one or more particular cells in a specific way, or non-specific, staining essentially all cells or most cells in the same or similar way. Histology stains include but are not limited to e.g., Alcian blue stains, Aniline blue stains, Azan stains, Biebrich scarlet-acid fuchsin stains, Carbol-fuchsin stains, Chrome alum/haemotoxylin stains, Congo Red stains, Crystal violet stains, Fast Red stains, Hematoxylin and Eosin (H&E) stains, Iron Hematoxylin stains, Isamin blue/eosin stains, Jenner's stains, Mallory's Phosphotungstic Acid Hematoxylin (PTAH) stains, Mallory's Trichrome stains, Masson stains, Malachite Green stains, Methyl Green-Pyronin (MGP) stains, Nissl and methylene blue stains, Nissl stains, Oil Red O stains, Orcein stains, Osmic Acid stains, Osmium Tetroxide stains, Papanicolaou stains, Periodic Acid-Schiff (PAS) stains, Reticulin stains, Romanowsky stains, Safranin O stains, Silver stains, Sudan Black and osmium stains, Toluidine-blue stains, Trichrome AB, Trichrome LG, Trypan Blue stains, van Gieson stains, Verhoff's stains, Weigert's resorcin-fuchsin stains, and the like.

Dyes included in histology stains will vary depending on the stain formulation and the desired staining result. In some instances, dyes useful in histology stains may include but are not limited to, e.g., Acid Fuchsin calcium salt, Acid fuschin, Alcian Blue, Alizarin Red, Aniline blue, Aniline Blue diammonium salt, Auramine O Dye, Azure, Azure A chloride, Azure B, Basic Fuchsin, Bismarck Brown Y, Brilliant Cresyl Blue, Brilliant Green, Carmine, Congo Red, Cresyl Violet acetate, Crystal Violet, Darrow Red, Eosin, Eosin B, Eosin Y, Eosin Y disodium salt, Erythrosin B, Erythrosin extra bluish, Ethyl eosin, Fast Green FCF, Hematoxylin, Indigo carmine, Janus Green B, Light Green SF Yellowish, Malachite Green oxalate salt, Methyl Blue, Methyl green, Methyl Green zinc chloride, Methyl Orange, Methyl violet 2B, Methylene blue, Methylene Violet (Bernthsen), Neutral Red, Nigrosin, Nile Blue A, Oil Red O, Orange G, Orange II sodium salt, Orcein synthetic, Phloxine B Dye, Pyronin B, pyronin G, Pyronin Y, Resazurin sodium salt, Rose Bengal sodium salt, Safranin O, Sudan Black B, Sudan III, Sudan IV, Thionin acetate salt, toluidine, Toluidine Blue P, and the like.

Histological stains include Romanowsky stains. Romanowsky stains are generally neutral stains composed of various components including but not limited to methylene blue (e.g., Azure B) and eosin (e.g., Eosin Y) dyes. Azures are basic dyes that bind acid nuclei and result in a blue to purple color. Eosin is an acid dye that is attracted to the alkaline cytoplasm producing red coloration. Romanowsky stains vary and include various formulations including those containing various azure and eosin analogs. Romanowsky stains and their mechanisms of staining are well-known and described in e.g., Horobin & Walter. *Histochemistry* (1987) 86:331-336; Marshall et al. *J Clin Pathol* (1978) 31(3):280-2; Marshall et al. *J Clin Pathol*. (1975) 28(11):920-3; *J Clin Pathol* (1975) 28(8):680-5; the disclosures of which are incorporated herein by reference.

Romanowsky stains include but are not limited to Giemsa Stain, Wright Stain, Wright Giemsa Stain, Jenner Stain, Jenner-Giemsa Stain, Leishman Stain, May Grunwald Stain, May Grunwals Giemsa Stain, and the like. Each Romanowsky stain may exist in various formulations either as derived from various different recipes or as supplied from various providers. Romanowsky stain formulations may include various stain components including but not limited to e.g., methylene blue, azure A, azure B, azure C, toluidine blue, thionine, methylene violet Bernthsen, methyl thionoline, thionoline, eosin, eosin Y, tribromofluorescein, fluorescein, thiazine dyes, and the like. Romanowsky stain formulations may include various solvents to dissolve stain components including aqueous and organic solvents including but not limited to e.g., water and alcohols including but not limited to e.g., methanol, ethanol, isopropyl alcohol, etc.

The histological stains and components thereof include those commercially available from such suppliers including not limited to e.g., Sigma Aldrich, Thermo Fisher Scientific, Avantor Proformance Materials, VWR International, Polysciences Inc., and the like.

Subjects from which a specimen may be acquired include but are not limited to human subjects, mammalian subjects (e.g., primates (apes, gorillas, simians, baboons, orangutans, etc.), ungulates (e.g., equines, bovines, camelids, swine, etc.), canines, felines, rodents (mice, rats, etc.), etc. Specimens may include biological fluid samples and biological samples which may be processed prior to imaging, e.g., processed onto a slide and histologically stained. In instances where the specimen is a blood sample the sample may be processed into a blood smear and stained with a hematological stain. Suitable methods for processing a blood sample include but are not limited to e.g., those described in U.S. Pat. Nos. 9,011,773 and 9,028,778; the disclosures of which are incorporated herein by reference.

Systems

The instant disclosure includes systems for classifying cells in a histologically stained specimen. The systems of the instant disclosure involve the extraction of stain-independent features from a histologically stained specimen. Such systems may include image processing circuitry configured to perform one or more of the steps of the methods of stain-independent feature extraction as described herein. Such systems may include an image capture device for generating images of the specimen or may receive pre-captured images from a connected device.

The components of the instant systems may be assembled in a single device or may be assembled as a system of components separated between in two or more devices. In some instances, a device, a system or components thereof that performs the image processing functions may be external but near (i.e., attached to the external housing of or on the same working surface or within the same room or building, etc.) a image capture device and/or histology analyzer that processes the specimen and/or obtains the digital image. In other instances, a device, a system or components thereof that perform the image processing functions may be positioned internally (i.e., within, inside of, or housed within) a histology analyzer that processes the specimen and/or obtains the digital image.

Image Capture Devices

At a minimum a suitable image capturing device will include a digital camera capable of capturing a digital image and a means of storing the digital image and/or transferring the image to attached image processing circuitry or to an attached storage device for later transfer to image processing circuitry. Suitable digital cameras will vary and will generally include any digital camera (e.g., with a CCD or CMOS sensor) with sufficiently high resolution and sufficient color capture to capture an image that may be processed according to the methods described herein. Depending on the particular features used in a subject method suitable digital cameras may include monochrome or color camera with resolution ranging from less than about 0.3 megapixel to about 14.0 megapixel or more including but not limited to e.g., 0.3 megapixel or more, 0.9 megapixel or more, 1.3 megapixel or more, 1.4 megapixel or more, 2 megapixel or more, 3 megapixel or more, 3.3 megapixel or more, 5 megapixel or more, 7 megapixel or more, 10 megapixel or more, 12 megapixel or more, 14.0 megapixel or more, and the like.

Suitable digital cameras include but are not limited to e.g., custom build digital cameras, consumer grade digital cameras (e.g., consumer grade digital cameras converted for microscopic use) and those digital microscopy cameras commercially available from various manufactures including but not limited to e.g., Dino-Eye, Dino-Lite, Jenoptik ProgRes, KoPa, Leica, Motic, Olympus, Omano, OptixCam, PixelINK, Zeiss, etc.

In some instances, a digital camera of the instant system may be attached to a microscope configured for manual or automated microscopy. Any suitable microscope may find use in the described systems provided the microscope is configured with sufficient optics and provides sufficient magnification to allow the capture of digital images that can be processed according to the methods described herein. As such, microscope components of the instant systems include custom units, e.g., as assembled from individual microscope components and commercially available units.

Suitable microscopes include but are not limited to e.g., those available from various manufactures including e.g., Bruker Optics (www(dot)brukeroptics(dot)com), Carl Zeiss (www(dot)zeiss(dot)com), CRAIC (www(dot)microspectra (dot)com), Edmund Optics (www(dot)edmundoptics(dot) com), FEI (www(dot)fei(dot)com), Hamamatsu (www(dot) hamamatsu(dot)com), Hirox-USA (www(dot)hirox-usa(dot) com), Hitachi High Technologies (www(dot)hitachi-hta (dot)com), JEOL (www(dot)jeol(dot)com), Keyence (www (dot)keyence(dot)com), Kramer (www(dot)kramerscientific (dot)com), Leica Microsystems (www(dot)leica(dot)com), Meiji Techno America (www(dot)meijitechno(dot)com), Motic Instruments (www(dot)motic(dot)com), Nikon Instruments (www(dot)nikoninstruments(dot)com), Ocean Optics (www(dot)oceanoptics(dot)com), Olympus (www (dot)olympusamerica(dot)com), OPTIKA Microscopes (www(dot)optikamicroscopes(dot)com), Phenom-World (www(dot)phenom-world(dot)com), Prior Scientific (www (dot)prior(dot)com), Warner (www(dot)warneronline(dot) com), and the like.

The instant microscopic systems may further include components for automated slide preparation, automated slide handling, automated imaging, automated scanning, and the like.

In some instances, a microscopic system of the instant disclosure may be encompassed within or connected, e.g., physically or electronically, to a histology analyzer, including e.g., an automated histology analyzer, an automated cytology analyzer, an automated hematological analyzer, etc.

Histology analyzers of the instant disclosure include but are not limited to e.g., those commercially available from Abbott Laboratories and/or Abbott Diagnostics (including e.g., the CELL-DYN systems, and the like), from Sysmex (including e.g., the Sysmex DI60, CellaVision DM1200, and the CellaVision DM9600 systems and the like), from MEDICA (including e.g., the EasyCell systems, and the like), from Horiba (including e.g., the Pentra and Micros systems, and the like), from Siemens (including e.g., the ADVIA and Kematek systems, and the like), from Beckman Coulter (including e.g., the UniCel systems, and the like), etc.

Computer and Circuitry Components

In some instances, the components of the systems as described herein may be connected by a wired data connection. Any suitable and appropriate wired data connection may find use in connecting the components of histology stain assessment systems, e.g., as described herein, including but not limited to e.g., commercially available cables such as a USB cable, a coaxial cable, a serial cable, a C2G or Cat2 cable, a Cat5/Cat5e/Cat6/Cat6a cable, a Token Ring Cable (Cat4), a VGA cable, a HDMI cable, a RCA cable, an optical fiber cable, and the like. In some instances, e.g., where data security is less of a concern, wireless data connections may be employed including but not limited to e.g., radio frequency connections (e.g., PAN/LAN/MAN/ WAN wireless networking, UHF radio connections, etc.), an infrared data transmission connection, wireless optical data connections, and the like.

In some instances, the systems of the instant disclosure include image processing circuitry. Such image processing circuitry may be programmed and/or contain instructions to perform one or more tasks related to processing a digital image received from an image capture device. For example, in some instances, the image processing circuitry is programmed to extract one or more stain-independent features, described above, a digital image obtained from digital storage or generated by an image capture device. In some instances, the image processing circuitry is programmed to make a comparison between a measured stain-independent feature and a reference stain-independent feature, e.g., as stored in a library, to make an assessment according to the methods described herein.

In some instances, image processing circuitry may be programmed to perform one or more steps in isolation or in combination of the methods described herein including but not limited to e.g., generate a mask of the subject digital image, determine an ROI of the subject digital image, extract one or more cellular features, extract one or more non-cellular features, extract one or more population features, determine a stain-independent feature based on two or more extracted cellular features, etc. In some instances, image processing circuitry may be further programmed to make a comparison between a measured stain-independent feature and a reference value for the stain-independent feature, e.g., to classify one or more cells of the sample.

In addition to the direct image processing steps, image processing circuitry may be, or may have an operable connection with additional circuitry, configured to perform one or more additional functions including but not limited to e.g., receive a digital image from an image capture device, retrieve a digital image from memory, retrieve a reference value from memory, store a processed image to memory, store a value obtained from a processed image to memory, store the result of a comparison to memory, etc.

In some instances, the systems as described herein further include a signal system where the signal system may be configured to report the result of a comparison or assessment. Such signal systems will vary depending on the particular configuration of the device and or system and may include but are not limited to e.g., an alarm, an indicator light, a display (e.g., a computer monitor, a graphical user interface (GUI), etc.), a printer configured to print, e.g., onto tangible media (including e.g., paper or tape), and the like. In some instances, the signal system indicates, e.g., sounds, lights up, or otherwise displays, to a user whether an abnormal cell is present in a specimen.

In some instances, the signal system indicates, e.g., sounds, lights up, or otherwise displays, to a user the cellular classification of one or more cells of the specimen. For example, in some instances, the system may include a display configured to report a result of one or more cellular classifications generated according to the methods described herein. In some instances, the system may transmit the result to a remote display or transmit the result as data (e.g., transmit to a data store, transmit to a user via electronic means (e.g., email), etc.). In some instances, a system may report the cell classification as part of a larger report, e.g., as part of a cell count or complete hematological report.

The image processing circuitry is specifically configured or programed to perform the functions according to the methods as described herein, including image feature extraction functions and comparison tasks, and may include at least one data processing unit for performing data related functions.

By "data processing unit", as used herein, is meant any hardware and/or software combination that will perform the functions required of it. For example, any data processing unit herein may be a programmable digital microprocessor such as available in the form of an electronic controller, mainframe, server or personal computer (desktop or portable). Where the data processing unit is programmable, suitable programming can be communicated from a remote location to the data processing unit, or previously saved in a computer program product (such as a portable or fixed computer readable storage medium, whether magnetic, optical or solid state device based).

Substantially any circuitry can be configured to a functional arrangement within the devices and systems for performing the methods disclosed herein. The hardware architecture of such circuitry, including e.g., a specifically configured computer, is well known by a person skilled in the art, and can comprise hardware components including one or more processors (CPU), a random-access memory (RAM), a read-only memory (ROM), an internal or external data storage medium (e.g., hard disk drive). Such circuitry can also comprise one or more graphic boards for processing and outputting graphical information to display means. The above components can be suitably interconnected via a bus within the circuitry, e.g., inside a specific-use computer. The circuitry can further comprise suitable interfaces for communicating with general-purpose external components such as a monitor, keyboard, mouse, network, etc. In some embodiments, the circuitry can be capable of parallel processing or can be part of a network configured for parallel or distributive computing to increase the processing power for the present methods and programs. In some embodiments, the program code read out from the storage medium can be written into a memory provided in an expanded board inserted in the circuitry, or an expanded unit connected to the circuitry, and a CPU or the like provided in the expanded board or expanded unit can actually perform a part or all of the operations according to the instructions of the programming, so as to accomplish the functions described.

The systems of the instant disclosure may further include a "memory" that is capable of storing information such that it is accessible and retrievable at a later date by a computer. Any convenient data storage structure may be chosen, based on the means used to access the stored information. In certain aspects, the information may be stored in a "permanent memory" (i.e. memory that is not erased by termination of the electrical supply to a computer or processor) or "non-permanent memory". Computer hard-drive, CD-ROM, floppy disk, portable flash drive and DVD are all examples of permanent memory. Random Access Memory (RAM) is an example of non-permanent memory. A file in permanent memory may be editable and re-writable.

In some instances, the system may include a memory containing reference values for making the comparisons of the assessments as described herein. For example, in some instances a memory of the instant system may include one or more reference target values, one or more reference ranges, one or more reference thresholds, and combinations thereof.

In addition to the components of the devices and systems of the instant disclosure, e.g., as described above, systems of the disclosure may include a number of additional components, such as data output devices, e.g., monitors and/or speakers, data input devices, e.g., interface ports, keyboards, etc., fluid handling components, power sources, etc.

Computer Readable Media

The instant disclosure includes computer readable medium, including non-transitory computer readable medium, which stores instructions for feature extraction methods. Aspects of the instant disclosure include computer readable medium storing instructions that, when executed by a computing device, cause the computing device to perform one or more of the steps of the feature extraction described herein.

In some instances, a computer readable medium of the instant disclosure stores instructions that cause a computing device to perform one or more of the steps of a morphology assessment of a histologically stained specimen as described herein. For example, in some instances, a computer readable medium of the instant disclosure stores instructions that cause a computing device to make a comparison of measured stain-independent feature and a reference value stored in a library. In some instances, a computer readable medium of the instant disclosure stores instructions that cause a computing device to make a determination, e.g., a cell classification, based on the comparison of measured stain-independent feature and a reference value stored in a library.

In some instances, a computer readable medium of the instant disclosure stores a library of reference stain-independent feature values, e.g., as described herein, e.g., as obtained from various histologically stained reference specimens for use in performing the methods as described herein. Such a computer readable medium may or may not be a component of a larger system, e.g., as described herein. Such a computer readable medium may or may not be removable from a larger device or system, e.g., as described herein.

In some instances, the library may be specific for a particular category of histological stains, e.g., a computer readable medium may store a library of reference spectral characteristics specifically for hematological stains, e.g., Romanowsky stains.

In some instances, a computer readable medium of the instant disclosure stores at least both instructions that cause a computing device to perform one or more of the steps of digital image feature extraction according to the methods as described herein and a library of reference stain-independent feature values. In some instances, a computer readable medium storing both instructions that cause a computing device to perform one or more of the steps of digital image feature extraction according to the methods as described herein and a library of reference stain-independent feature values is specific for hematological stains, e.g., Romanowsky stains.

In certain embodiments, instructions in accordance with the methods described herein can be coded onto a computer-readable medium in the form of "programming", where the term "computer readable medium" as used herein refers to any storage or transmission medium that participates in providing instructions and/or data to a computer for execution and/or processing. Examples of storage media include a floppy disk, hard disk, optical disk, magneto-optical disk, CD-ROM, CD-R, magnetic tape, non-volatile memory card, ROM, DVD-ROM, Blue-ray disk, solid state disk, and network attached storage (NAS), whether or not such devices are internal or external to the computer. A file containing information can be "stored" on computer readable medium, where "storing" means recording information such that it is accessible and retrievable at a later date by a computer.

The computer-implemented method described herein can be executed using programming that can be written in one or more of any number of computer programming languages. Such languages include, for example, Java (Sun Microsystems, Inc., Santa Clara, Calif.), Visual Basic (Microsoft Corp., Redmond, Wash.), and C++ (AT&T Corp., Bedminster, N.J.), as well as any many others.

The following examples are offered by way of illustration and not by way of limitation.

EXPERIMENTAL

Example 1

Stain-Independent Features for Cells Containing Nucleated Material

Figure 1B:
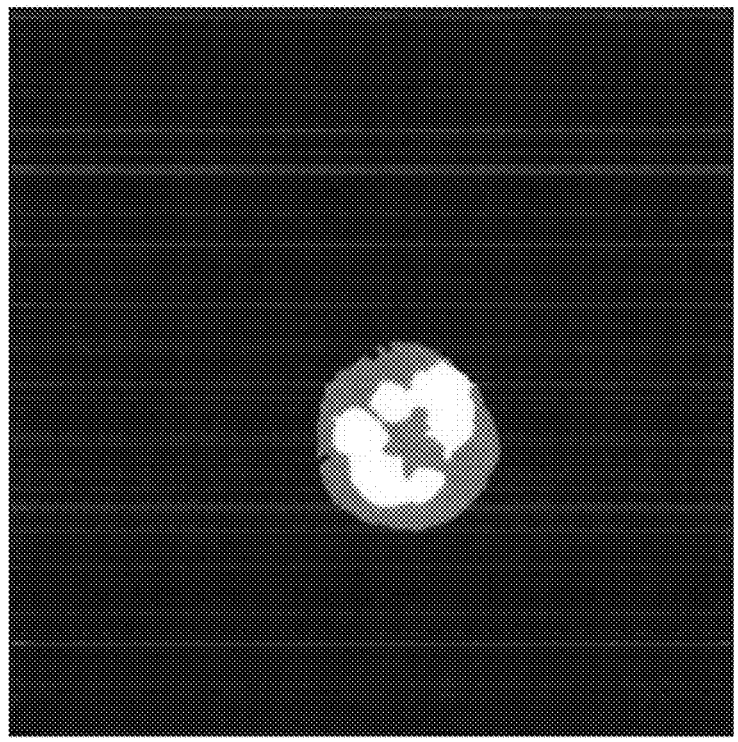

For cells containing nucleated material (i.e., nucleated masks), e.g., white blood cells (WBCs) and nucleated red blood cells (NRBCs), the following stain independent features were calculated:

Stain-independent color features: Instead of using the statistical color features (e.g., mean, median, standard deviation of red, green and blue or any other color space) derived from either the entire cell mask or entire nuclear mask, the ratio of the color features of the nucleus and the color features of the cytoplasm were used. Using ratios of these color features provided a means by which colors in a particular cell compartment could be normalized relative to another, based on the observation that colors of all cell components change proportionally relative to each other when changes are the result of variations in staining (e.g., if the stain darkens the color of the nuclear components, it also darkens the components of the cytoplasmic compartment proportionally). Such normalization enabled the detection of true differential color changes in compartmental cell structures associated with cell morphology characteristics from changes of colors caused merely from stain variations. Cell mask, cytoplasm mask, and nuclear mask were segmented using various computerized approaches, including e.g., a segmentation process based on a watershed algorithm. Representatives of a cell mask, cytoplasm mask and nuclear mask derived from a captured RGB image of a representative WBC (FIG. 1A) are illustrated in FIG. 1B (the nuclear mask is bright white and the cytoplasm mask is gray).

Stain independent contour features: The ratio of the contour features of the cell nucleus and the entire cell were calculated and used. Contour features relate to all the boundary properties of the region of interest area and included individual measures of the perimeter, convex hull perimeter, maximal convexity depth, average convexity depth, area, convex hull area, circularity, convexity and combinations thereof.

Various methods of calculating contour features were used. For example, circularity and convexity were calculated according to the following:

Circularity=Perimeter/(4π×Area)

Convexity=Convex Hull Area/Area

Contour features were calculated from various masks including, e.g., a nuclear mask or a cytoplasm mask as pictured in FIG. 1B.

Example 2

Stain-Independent Features for Red Blood Cells

Relative color features: Relative color features of RBCs were used to measure a feature of a cell against a feature of all other cells within the same image. This required the features to be calculated for all cells within the image first before computing the relative features for each cell. Relative color features were calculated for the following components for the entire red blood cells.

Mean of red channel for an individual cell/mean of red channel of all cells in the image Mean of green channel for an individual cell/mean of green channel of all cells in the image Mean of blue channel for an individual cell/mean of blue channel of all cells in the image Relative color features were also calculated in other color spaces such as Hue, saturation-value (HSV), International Commission on Illumination (CIE) Lab (a color opponent space with dimension L for lightness and a and b for the color opponent dimensions, based on nonlinearly compressed coordinates), CIE LUV (a color space in colorimetry adopted by the CIE committee), YCbCr (a color space used as a part of the color image pipeline and digital photography system; Y is the Luma component and Cb and Cr are the blue difference and red difference chroma components), etc.

By normalizing channel color values for an individual cell to the mean value for all cells, these Relative Color Features provided a means to differentiate color deviations that characterize specific cell morphologies from color deviations brought about by stain variations.

Lightness change features: Central pallor characteristic is one important feature to differentiating normal red blood cell and other abnormal red blood cells. Normal red blood cells have an area of pallor in the center. This area of central pallor is increased in hypochromic cells and decreased or nonexistent in spherocytes and polychromatophilic RBCs. Target cells, on the other hand, have a centrally located disk of hemoglobin surrounded by an area of pallor with an outer rim of hemoglobin adjacent to the cell membrane giving the cell the appearance of a "target". Thus, creating stain independent features to qualify this particular cell feature enabled a more accurate automatic differentiation and classification of normal and abnormal cells.

It was observed that one way to characterize the central pallor features was to first segment the area of the central pallor (tack of hemoglobin) and then calculate shape features compared to the entire cell, such as the area ratio of the central pallor and the entire cell, circularity of the central pallor, existence of right like interior structure within the central pallor, etc. However, when these calculations are performed the results of often undesirable because segmentation results are often unreliable due to the variation of stain concentration and/or variation across different stains variants.

Figure 2A:
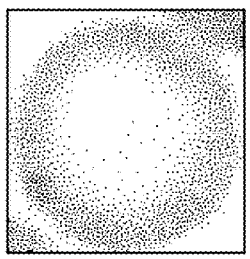
FIG. 2A-2D depicts representative images illustrating the extraction of lightness change features applied to an erythrocyte.
Figure 2B:
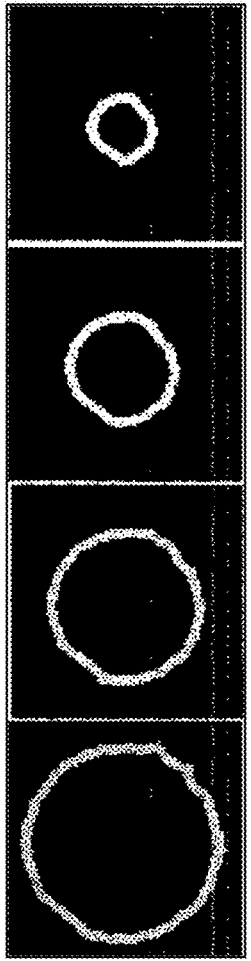

A new way to extract the stain independent central pallor features without segmentation was devised:

Step 1. From cell periphery to center, a set of ring-like masks was extracted according to the percentage of distance from centroid of the cell to the periphery, e.g., illustrated as 20%, 40%, 60% and 80% in FIG. 2B.

Figure 2D:
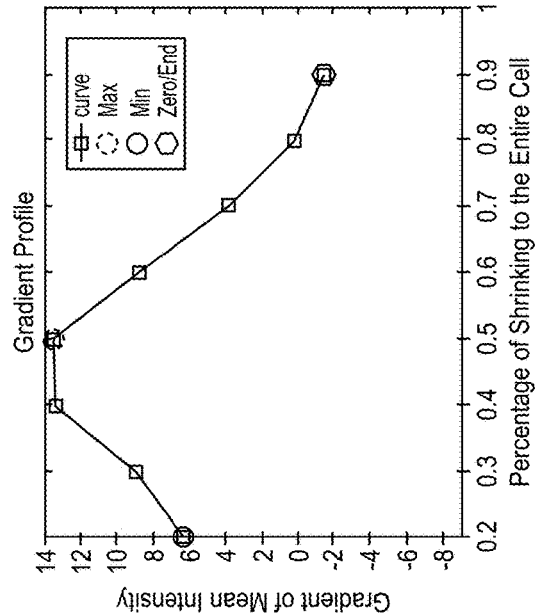
Figure 2C:
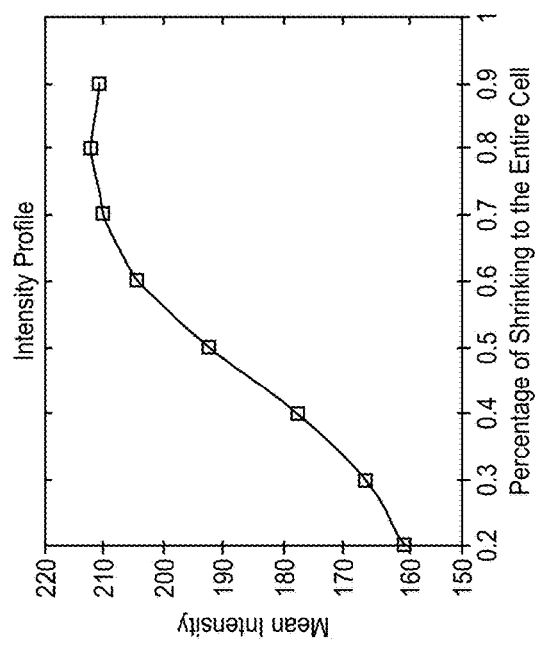

Step 2. For each mask area, the mean or median value of the intensity for any color channel with and without applying any color space transform was calculated. FIG. 2C illustrates an example of a near monotonically increasing profile for a hypochromic cell.

Step 3. The first order derivative (gradient) of the intensity profile was calculated. An example is shown in FIG. 2D.

Step 4. Stain-independent central pallor lightness change features was extracted as Maximal gradient magnitude, minimal gradient magnitude, the position of maximal gradient magnitude, the position of minimal magnitude, and/or the absolute difference of the maximal and minimal gradient magnitude.

Figure 3A:
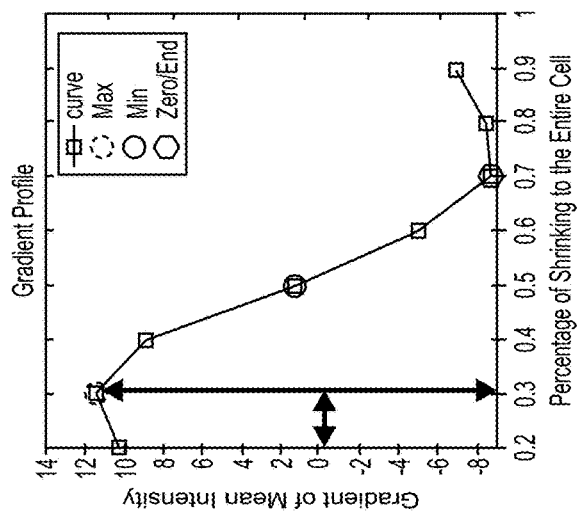
FIG. 3A-3C depicts light change features and corresponding peak locations for different types of red blood cells.
Figure 3A:
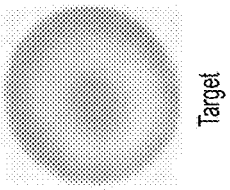
Figure 3B:
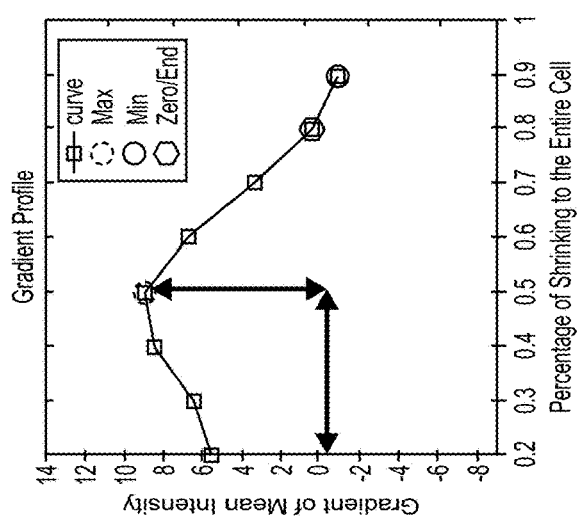
Figure 3B:
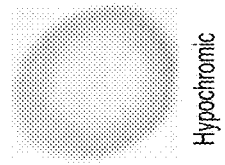
Figure 3C:
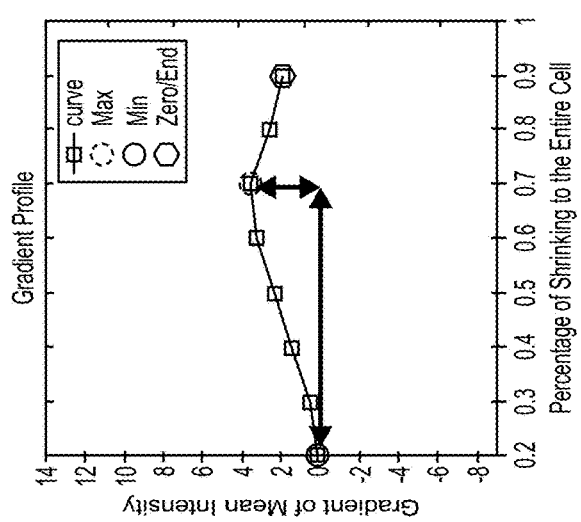
Figure 3C:
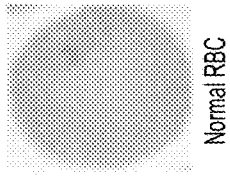

Individual features and combinations of features above were used as stand-alone features to classify a cell either via a supervised/trained classifier or an un-supervised classification approach. Individual features and combinations of features above were also used in conjunction with other cell shape and contour features to classify a cell via a supervised/trained classifier or an un-supervised classification approach. Examples of absolute difference of maximal and minimal gradient magnitude and the maximal change position for a normal red blood cell, a hypochromic cell, and a target cell are illustrated in FIG. 3A-3C.

FIG. 2: Representative images illustrating lightness change feature extraction. An example of a hypochromic red blood cell is pictured in FIG. 2A. From cell periphery to the center, a set of masks were extracted according to the percentage of distance from the centroid of the cell to the periphery, illustrated as 20%, 40%, 60% and 80% (FIG. 2B). The corresponding mean intensity profile for the periphery to cell center and the corresponding gradient profile from the periphery to center are provided in FIG. 2C and FIG. 2D, respectively.

FIG. 3: Light change feature and its corresponding peak location for different types of red blood cells: a normal RBC (FIG. 3A), a hypochromic RBC (FIG. 3B), and a target cell (FIG. 3C) are also provided.

Although the foregoing invention has been described in some detail by way of illustration and example for purposes of clarity of understanding, it is readily apparent to those of ordinary skill in the art in light of the teachings of this invention that certain changes and modifications may be made thereto without departing from the spirit or scope of the appended claims.

Accordingly, the preceding merely illustrates the principles of the invention. It will be appreciated that those skilled in the art will be able to devise various arrangements which, although not explicitly described or shown herein, embody the principles of the invention and are included within its spirit and scope. Furthermore, all examples and conditional language recited herein are principally intended to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. The scope of the present invention, therefore, is not intended to be limited to the exemplary embodiments shown and described herein. Rather, the scope and spirit of present invention is embodied by the appended claims.

What is claimed is:

1. A method of extracting stain-independent cellular features, the method comprising:
   a) generating a cellular mask of a digital image of a histologically stained specimen;
   b) extracting a first cellular feature of a cell, defined by the cellular mask;
   c) extracting a second feature over a region of interest (ROI) of the histology specimen, wherein the ROI is a non-cellular feature of the histology specimen, wherein the first and second features are not affected by variation in the staining or are proportionally affected by variation in the staining;
   d) determining a stain-independent feature of the cell by calculating the ratio of the first cellular feature of the cell to the second feature over an ROI of the histology specimen; and
   e) classifying the cell based on the stain-independent feature.

2. The method of claim 1, wherein the first cellular feature and the second feature are color features.

3. The method of claim 2, wherein the first color feature of the cell and the second color feature comprise the mean intensities in the red channel of the digital image.

4. The method of claim 2, wherein the first color feature of the cell and the second color feature comprise the mean intensities in the green channel of the digital image.

5. The method of claim 2, wherein the first color feature of the cell and the second color feature comprise the mean intensities in the blue channel of the digital image.

6. The method of claim 2, wherein the method further comprises calculating a mean or median value of an intensity for the second color feature with and without applying any color space transform.

7. The method of claim 1, wherein the first cellular feature and the second feature are lightness features.

8. The method of claim 7, wherein the lightness features comprise color-independent mean intensities or color-independent median intensities.

9. The method of claim 8, wherein the color-independent mean intensities or color-independent median intensities comprise a plurality of concentric pallor rings.

10. The method of claim 7, wherein the lightness features comprise a maximal gradient magnitude, a minimal gradient magnitude, a position of maximal gradient magnitude, a position of minimal magnitude, or an absolute difference of the maximal and minimal gradient magnitude.

11. The method of claim 1, wherein the first cellular feature and the second feature are contour features.

12. The method of claim 11, wherein the contour features are selected from the group consisting of: perimeter, convex hull perimeter, maximal convexity depth, average convexity depth, area, convex hull area, circularity, convexity and combinations thereof.

13. The method of claim 1, wherein the first cellular feature and the second feature are invariant moment features.

14. The method of claim 1, wherein the first cellular feature and the second feature are image texture features.

15. The method of claim 1, wherein the method further comprises extracting:
   a third cellular feature of the cell; and
   a fourth cellular feature over an ROI of the histology specimen,
   wherein the ROI is the cell.

16. The method of claim 1, wherein the method further comprises extracting:
   a third cellular feature of a nucleus of the cell; and
   a fourth cellular feature over an ROI of the histology specimen, wherein
   the ROI is the nucleus of the cell or a portion thereof.

17. The method of claim 1, wherein the method further comprises extracting:

a third cellular feature of a cytoplasm of the cell; and a fourth cellular feature over an ROI of the histology specimen, wherein the ROI is the cytoplasm of the cell or a portion thereof.

18. The method of claim 1, wherein the method further comprises extracting:
a third cellular feature of the cell, and
a fourth cellular feature over an ROI of the histology specimen, wherein the ROI is the nucleus of the cell or a portion thereof.

19. The method of claim 18, wherein the ROI is one or more nuclear lobes of the cell.

20. The method of claim 1, wherein the method further comprises extracting:
a third cellular feature of the cell; and
a fourth cellular feature over an ROI of the histology specimen, wherein the ROI is the cytoplasm of the cell or a portion thereof.

21. The method of claim 1, wherein the non-cellular feature of the histology specimen is the background.

22. The method of claim 1, wherein the method further comprises extracting:
a third cellular feature; and
a fourth cellular feature over an ROI of the histology specimen,
wherein the third cellular feature and the ROI are first and second ring portions of the cell concentric with the cell.

23. The method of claim 1, wherein the method further comprises extracting:
a third cellular feature of the cell; and
a fourth cellular feature over an ROI of the histology specimen, wherein the ROI is a population of cells defined by the cellular mask.

24. The method of claim 1, wherein the classifying comprises identifying the cell type.

25. The method of claim 1, wherein the classifying comprises identifying the cell as normal or abnormal.

26. The method of claim 1, wherein the method further comprises extracting the stain-independent feature for a plurality of cells of the image.

27. The method of claim 1, wherein the histologically stained specimen is a hematological stained specimen.

28. The method of claim 1, wherein the first cellular feature is extracted according to the percentage of distance from the centroid of the cell to the periphery of the cell.

29. The method of claim 1, wherein the second feature comprises a color feature of a population of the cells defined by the cellular mask.

30. A method of stain-independently assessing cell morphology in a histologically stained specimen, the method comprising:
a) extracting one or more stain-independent cellular features according to claim 1; and
b) comparing the one or more extracted stain-independent features to corresponding reference values for the one or more stain-independent features to assess the morphology of the cell.

31. The method of claim 30, wherein the cell is a white blood cell, nucleated red blood cell or giant platelet and the stain independent cellular features comprise one or more features selected from the group consisting of: a contour feature, an invariant moment feature, an image texture feature, a nuclear lobe feature, a ratio of two cellular color features, a ratio of a cellular color feature and a non-cellular color feature, and combinations thereof.

32. The method of claim 30, wherein the cell is a red blood cell and the stain independent cellular features comprise one or more features selected from the group consisting of: a contour feature, an invariant moment feature, an image texture feature, an optical density feature, a lightness feature, and combinations thereof.

* * * * *